(12) United States Patent
Reagan et al.

(10) Patent No.: US 11,435,487 B2
(45) Date of Patent: Sep. 6, 2022

(54) RADIOACTIVITY DETECTOR AND RADIOACTIVITY DETECTION METHOD OPTIMIZABLE FOR SAMPLE GEOMETRY

(71) Applicant: MIRION TECHNOLOGIES (CANBERRA) INC., Meriden, CT (US)

(72) Inventors: Edward Lee Reagan, Knoxville, TN (US); Olivier Evrard, Olen (BE); Amol Patil, Meriden, CT (US); Sam Thys, Olen (BE); Sofie Put, Olen (BE)

(73) Assignee: MIRION TECHNOLOGIES (CANBERRA), INC., Meriden, CT (US)

( * ) Notice: Subject to any disclaimer, the term of this patent is extended or adjusted under 35 U.S.C. 154(b) by 16 days.

(21) Appl. No.: 17/081,690

(22) Filed: Oct. 27, 2020

(65) Prior Publication Data

US 2022/0128716 A1 Apr. 28, 2022

(51) Int. Cl.
*G01T 1/24* (2006.01)
*G01T 7/00* (2006.01)

(52) U.S. Cl.
CPC .............. *G01T 1/24* (2013.01); *G01T 7/005* (2013.01)

(58) Field of Classification Search
CPC .................. G01T 1/24; G01T 7/005
See application file for complete search history.

(56) References Cited

U.S. PATENT DOCUMENTS

2017/0146668 A1* 5/2017 Evrard .................. G01T 1/2018
2021/0239862 A1* 8/2021 Petrak .................. G01T 1/2985

* cited by examiner

*Primary Examiner* — Hugh Maupin
(74) *Attorney, Agent, or Firm* — Ladas & Parry, LLP

(57) ABSTRACT

A radiation detector comprising a semiconductor radiation sensing surface having N radiation sensing surface segments of equal size, each radiation sensing surface segment being connected to a respective sensor circuit that outputs one of N output analog signals in response to radiation of a first type impinging on the radiation sensing surface segment connected to the sensor circuit; and a signal processor arrangement having N signal processing circuits that each receive and process one of said N first analog signals, where N is an integer larger than 1.

20 Claims, 16 Drawing Sheets

|  | Segment A | Segments A+B | Segments A+B+C |
|---|---|---|---|
| Alpha Background (CPM) | 0.01 | 0.02 | 0.03 |
| Beta Background (CPM) | 0.3 | 0.6 | 0.9 |
| Alpha Efficiency % | 17.5% | 29.4% | 35% |
| Beta Efficiency % | 22.5% | 37.8% | 45% |

FIG. 11

|  | Segment A | Segments A+B | Segments A+B+C |
|---|---|---|---|
| Alpha MDA (Bq) | 7.01 E-3 | 5.26 E-3 | 5.13 E-3 |
| Beta MDA (Bq) | 2.09 E-2 | 1.71 E-2 | 1.74 E-2 |

FIG. 12

|  | Segments B | Segments B+C |
|---|---|---|
| Alpha Background (CPM) | 0.01 | 0.02 |
| Beta Background (CPM) | 0.3 | 0.6 |
| Alpha Efficiency % | 11.9% | 17.5% |
| Beta Efficiency % | 15.3% | 22.5% |

FIG. 13

|  | Segment B | Segments B+C |
|---|---|---|
| Alpha MDA (Bq) | 1.03 E-2 | 8.84 E-2 |
| Beta MDA (Bq) | 3.07 E-2 | 2.87 E-2 |

FIG. 14

RADIOACTIVITY DETECTOR AND RADIOACTIVITY DETECTION METHOD OPTIMIZABLE FOR SAMPLE GEOMETRY

TECHNICAL FIELD

Embodiments of the present disclosure relate to radioactivity detectors and radioactivity detection methods that are adaptable to the size or geometry of a radioactivity emitting sample.

BACKGROUND ionizing radiation samples are measured in laboratory as well as in-situ instruments. These instruments can use detector technologies including gas detectors (Gas flow proportional and Geiger-Mueller), semiconductor detectors, scintillation detectors, and other detector types. All these detector technologies employ a single detector with a fixed size regardless of the sample size. An integrated system of processing electronics, detector and software interprets the pulse height, pulse shape, rise time, region of interest or other analysis methods to determine radiation type or even specific nuclides measured. Multiple radiation types (e.g. alpha and beta) are routinely measured concurrently. The radiations emitted from samples of various sizes are measured using different detectors adapted each to the sample size. There exists a need for a radiation detector that can efficiently measure radiations emitted from samples of various sizes.

SUMMARY

Embodiments of this presentation relate to a variable segment detector array for an improved signal to noise ratio over a single detector with a same physical detection area.

Embodiments of this presentation comprise a multi-radiation measurement method and system that allows for measurement optimization of alpha, beta, gamma and other types of radiation based on the use of only selected detector segments within a larger detector array. The proposed detection method uses the performance characteristics of each equally sized detector segment rather than only consolidated performance characteristics of the whole detector array. The choice of using only selected detector segments can be based on e shape and size and distribution of the sample and may contribute to achieving lower detection limits and/or shorter analysis times. As many measurements employ discrimination methods within a single measurement to differentiate between different types of radiation (e.g. Alpha and Beta simultaneously), different combinations of detector segments can be utilized for each radiation type. As an added benefit, unused segments can be employed as an internal crosscheck to verify the operation of the utilized segments.

Embodiments of this presentation comprise a segmented semiconductor detector array that allows measurement of radiation (alpha, beta and gamma emissions) on two or more detector segments. According to this presentation, the segmenting of a semiconductor detector surface into smaller detector surface segments improves the performance of a semiconductor detector for a same radiation detection surface, at least due to the ability to selectively use/discard data from segment(s).

Exemplary embodiments of this presentation comprise at least the following concepts:

Concept 1. A radiation detector comprising: a semiconductor radiation sensing surface comprising N radiation sensing surface segments of equal size, each radiation sensing surface segment being connected to a respective sensor circuit that outputs one of N output analog signals in response to radiation of a first type impinging on the radiation sensing surface segment connected to the sensor circuit; and a signal processor arrangement having N signal processing circuits that each receive and process one of said N first analog signals, where N is an integer larger than 1.

Concept 2. The detector of concept 1, having a first mode of operation wherein the signal processor arrangement uses the processed first analog signals to determine a Minimum Detectable Activity of said radiation of a first type, emitted by a first source of radiation having a first size and located at a first distance of the detector, impinging on each of the radiation sensing segments and impinging on each combination of the radiation sensing segments.

Concept 3. The detector of concept 2, wherein the signal processor arrangement is provided to display each calculated Minimum Detectable Activity of said radiation of a first type to a user in said first mode of operation, and is arranged for, in a second mode of operation, display measurements of activity of said radiation of a first type emitted by a second source of radiation having said first size and located at said first distance of the detector made only by a radiation sensing segment or combination of radiation sensing segments selected by said user.

Concept 4. The detector of concept 2, wherein the signal processor arrangement is provided to, in a second mode of operation, automatically display measurements of activity of said radiation of a first type emitted by a second source of radiation having said first size and located at said first distance of the detector made only by a radiation sensing segment or combination of radiation sensing segments having the lowest calculated Minimum Detectable Activity of said radiation of a first type.

Concept 5. The detector of concept 2, wherein each of said sensor circuits further provides one of N second analog signals output in response to radiation of a second type impinging on the radiation sensing surface segment connected to the sensor circuit, each signal processing circuit being provided to receive and process the first and second analog signals issued by a same sensor circuit; and wherein in said first mode of operation the signal processor arrangement uses the processed second analog signals to determine a Minimum Detectable Activity of said radiation of a second type emitted by said first source of radiation having a first size and located at a first distance of the detector and impinging on each of the radiation sensing segments and on each combination of the radiation sensing segments.

Concept 6, The detector of concept 5, wherein the signal processor arrangement is provided to display each calculated Minimum Detectable Activity of said radiation of a first type to a user in said first mode of operation, and is arranged for, in a second mode of operation, display measurements of activity of said radiation of a first type emitted by a second source of radiation having said first size and located at said first distance of the detector made only by a first radiation sensing segment or combination of radiation sensing segments selected by said user; and wherein the signal processor arrangement is provided to display each calculated Minimum Detectable Activity of said radiation of a second type to a user in said first mode of operation, and is arranged for, in said second mode of operation, display measurements of activity of said radiation of a second type emitted by said second source of radiation made only by a second radiation sensing segment or combination of radiation sensing segments selected by said user.

Concept 7, The detector of concept 5, wherein the signal processor arrangement is provided to, in a second mode of operation, automatically display measurements of activity of said radiation of a first type emitted by a second source of radiation having said first size and located at said first distance of the detector made only by a radiation sensing segment or combination of radiation sensing segments having a lowest calculated Minimum Detectable Activity of said radiation of a first type; and wherein the signal processor arrangement is provided to, in said second mode of operation, automatically display measurements of activity of said radiation of a second type emitted by said second source of radiation made only by a radiation sensing segment or combination of radiation sensing segments having a lowest calculated Minimum Detectable Activity of said radiation of a second type.

Concept 8. The detector of concept 1 to 7, wherein the semiconductor radiation sensing surface forms a simple geometric shape and wherein each radiation sensing surface segment forms 1/Nth of the semiconductor radiation sensing surface.

Concept 9. The detector of concept 8, wherein the semiconductor radiation sensing surface forms a circle, and wherein each radiation sensing surface segment forms a radial sector of said circle.

Concept 10. The detector of concept 8, wherein the semiconductor radiation sensing surface forms a circle, and wherein a first radiation sensing surface segment forms a sub-circle having the same center as said circle and the other radiation sensing surface segments form concentric rings having the same center as said circle.

Concept 11. The detector of concept 8, wherein the semiconductor radiation sensing surface forms a circle, and wherein a first radiation sensing surface segment forms a sub-circle having the same center as said circle and the other radiation sensing surface segments form sectors of a ring having the same center as said circle.

Concept 12. The detector of concept 8, wherein the semiconductor radiation sensing surface forms a circle, and wherein a first radiation sensing surface segment forms a sub-circle having the same center as said circle and the other radiation sensing surface segments form sectors of a plurality of concentric rings having the same center as said circle.

Concept 13. The detector of concept 8, wherein the semiconductor radiation sensing surface forms a circle, wherein N=3 and wherein the three radiation sensing surface segments comprise two circle caps separated by a wedge.

Concept 14. The detector of concept 1 to 13, wherein each radiation sensing surface segment comprises a sensing conductor electrically connected to a signal conductor; the sensing and signal conductors of all the radiation sensing surface segments being coplanar.

Concept 15. The detector of concept 14, wherein each signal conductor adjacent to at least another signal conductor.

Concept 16. A method of detecting radiation, the method comprising: providing a semiconductor radiation sensing surface comprising N radiation sensing surface segments of equal size, each radiation sensing surface segment being connected to a respective sensor circuit that outputs one of N output analog signals in response to radiation of a first type impinging on the radiation sensing surface segment connected to the sensor circuit; and providing a signal processor arrangement having N signal processing circuits that each receive and process one of said N first analog signals, where N is an integer larger than 1.

Concept 17. The method of concept 16 comprising, during a first mode of operation, providing a first source of said radiation of a first type having a first size and located at a first distance of the detector; and with the signal processor arrangement, using the processed first analog signals to determine a Minimum Detectable Activity of said radiation of a first type impinging on each of the radiation sensing segments and impinging on each combination of the radiation sensing segments.

Concept 18. The method of concept 1.7 comprising: with the signal processor arrangement, displaying each calculated Minimum Detectable Activity of said radiation of a first type to a user in said first mode of operation and allowing said user to select a radiation sensing segment or combination of radiation sensing segments; and in a second node of operation, replacing said first source by a second source of said radiation of a first type having said first size and located at said first distance of the detector; and displaying measurements of activity of said radiation of a first type made only by the radiation sensing segment or combination of radiation sensing segments selected by said user.

Concept 19. The method of concept 17, comprising: in a second mode of operation, replacing said first source by a second source of said radiation of a first type having said first size and located at said first distance of the detector; and automatically displaying with the signal processor arrangement a measurement of activity of said radiation of a first type made only by a radiation sensing segment or combination of radiation sensing segments having a lowest calculated Minimum Detectable Activity of said radiation of a first type.

Concept 20. A method of measuring radiations, the method comprising: providing a radiation sensing surface comprising N radiation sensing surface segments of equal size; and in a first mode of operation: measuring a background noise for each segment or combination of segments for at least one measured radiation; providing a calibration sample having a given diameter at a measurement location in front of said radiation sensing surface; determining an efficiency for each segment or combination of segments for said sample for said at least one measured radiation; determining a Minimum Detectable Activity for each segment or combination of segments for said at least one measured radiation using said background noises and efficiencies; and selecting automatically or manually a segment or combination of segments having the lowest MDA for said at least one measured radiation; and in a second mode of operation, determining an amount of said at least one measured radiation emitted by a measurement sample having the same position and diameter as the calibration sample, using the segment or combination of segments selected for said at least one measured radiation.

Concept 21. The method of concept 20, wherein said at least one radiation comprises at least a first radiation and a second radiation; and wherein: said measuring a background noise for each segment or combination of segments for at least one measured radiation comprises measuring a background noise for each segment or combination of segments separately for the first and second measured radiations; said determining an efficiency for each segment or combination of segments for said calibration sample for said at least one measured radiation comprises determining an efficiency for each segment or combination of segments for said calibration sample separately for the first and second measured radiations; said determining a Minimum Detectable Activity for each segment or combination of segments for said at least one measured radiation using said background noises and efficiencies comprises determining a Minimum Detectable Activity for each segment or combination of segments separately for the first and second measured radiations; said selecting automatically or manually a segment or combination of segments having the lowest MDA for said at least one measured radiation comprises selecting automatically or manually a segment or combination of segments having the lowest MDA separately for the first and second measured radiations; and said determining an amount of said at least one measured radiation emitted by said measurement sample using the segment or combination of segments selected for said at least one measured radiation comprises determining separately an amount of said first and second measured radiation emitted by said measurement sample using the segment or combination of segments selected for said first and second measured radiations.

This Summary is provided to introduce a selection of concepts in a simplified form that are further described below in the Detailed Description. This summary is not intended to be used to limit the scope of the claimed subject matter.

BRIEF DESCRIPTION OF THE DRAWINGS

Various embodiments in accordance with the present disclosure will be described with reference to the drawings, in which:

FIG. 11 is a table illustrating operating parameters of the detector of FIG. 10.

FIG. 12 is a table illustrating the performances of the detector of FIG. 11.

FIG. 13 is a table illustrating operating parameters of the detector of FIG. 10 with a segment made inoperative.

FIG. 14 is a table illustrating the performances of the detector of FIG. 13.

The figures are drawn to clearly illustrate the relevant aspects of the embodiments and are not necessarily drawn to scale.

DETAILED DESCRIPTION OF EMBODIMENTS in the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
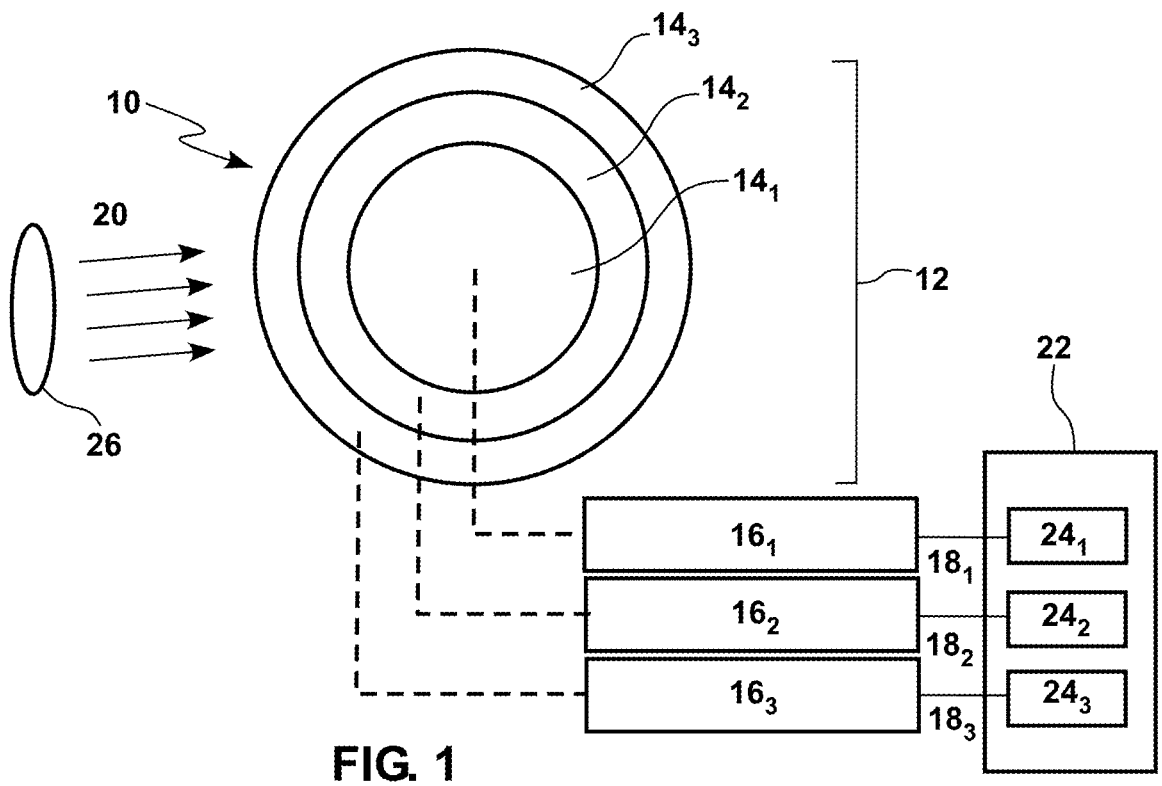
FIG. 1 illustrates schematically a radiation detector according to an embodiment of this presentation.

FIG. 1 illustrates schematically a radiation detector 10 according to an embodiment of this presentation, comprising a semiconductor radiation sensing surface 12 having N radiation sensing surface segments $14_1$, $14_2$, $14_3$ of equal size. According to embodiments of this presentation, N is an integer larger than 1. In FIG. 1, N is equal to 3; surface 12 forms a circle; the first radiation sensing surface segment $14_1$ forms a sub-circle having the same center as surface 12 and the other radiation sensing surface segments $14_2$, $14_3$ form concentric rings having the same center as surface 12, According to embodiments of this presentation, each radiation sensing surface segment ($14_1$, $14_2$, $14_3$) is connected to a respective sensor circuit $16_1$, $16_2$, $16_3$ provided to output an output analog signal $18_1$, $18_2$, $18_3$ in response to radiation 20 of a first type (for example alpha radiation, or beta radiation, or gamma radiation) impinging on the radiation sensing surface segment ($14_1$, $14_2$, $14_3$) connected to the sensor circuit. Thus, N first output analog signals ($18_1$, $18_2$, $18_3$) are produced: one by each of the N sensor circuits ($16_1$, $16_2$, $16_3$) attached to a corresponding radiation sensing surface segment ($14_1$, $14_2$, $14_3$). According to embodiments of this presentation, detector 10 further comprises a signal processor arrangement 22 having N signal processing circuits $24_1$, $24_2$, $24_3$ that each receive and process one respective of said N first analog signals $18_1$, $18_2$, $18_3$. According to embodiments of this presentation, the IN signal processing circuits $24_1$, $24_2$, $24_3$ form part of N dedicated processing channels that receive and process in parallel the N analog signals $18_1$, $18_2$, $18_3$.

According to embodiments of this presentation, detector 10 is provided for, in a first mode of operation such as a calibration mode of operation, having signal processor arrangement 22 use the processed first analog signals $18_1$, $18_2$, $18_3$ to determine a Minimum Detectable Activity (MDA) of said radiation of a first type (alpha radiation, or beta radiation, or gamma radiation) impinging on each of the radiation sensing segments ($14_1$, $14_2$, $14_3$) and impinging on each combination of the radiation sensing segments (in FIG. 1, such combinations are $14_1$ combined with $14_2$, $14_1$ combined with $14_3$, $14_2$ combined with $14_3$, and $14_1$ combined with $14_2$ and with $14_3$). A calibration sample 26, having a first size and located at a first distance of the radiation sensing surface 12, can be used in the first mode of operation to generate radiation 20. The MDA corresponds to the lowest quantity of a radioisotope which can be detected. It is fundamentally based on the statistical variation of detector counts in the region where the isotope would appear.

According to embodiments of this presentation, the MDA for a detector system can be determined using the following equation:

$$\frac{\frac{K^2}{T_S} + 2K\sqrt{\frac{R_B}{T_S} + \frac{R_B}{T_B}}}{\varepsilon}$$

(LA Currie, Limits for Qualitative Detection and Quantitative determination. Analytical Chemistry 40(3)(1968)586-693.)
where Ts is the Time of sample count, $R_B$ is the Background noise count rate, TB is the Time of background noise count, ε is the Efficiency of the sensing segment, and K at the 95% confidence interval=1.645. This is the standardized 95% confidence interval value. If on a standard normal curve (which this is), one were to draw a vertical line at the x=1.645 mark, and shade to the left of this point everything underneath the curve, one would shade in 95% of the data underneath that curve.
Efficiency can be defined as a segment's response to a radiation source represented as a percentage of the ratio of observed counts per time period/known emissions.
As detailed hereafter for example in relation with FIGS. 10-12, using a combination of segments of a detector according to embodiments of this presentation on the basis of the MDA of the segments for a specific sample size or orientation, allows using only the detector segments best suited for said specific sample size or orientation.

Counting efficiency decreases as the ratio of the (active) area of the sample to detector surface area increases. Typical air filter media, smear/swipe media and planchets used for water, soil and non-soil solids have a diameter of 47 mm. Many BZ (breathing zone-lapel sampler) samples use a smaller diameter sample 10-25 mm. Using equation (2) hereafter, it can be shown that a 2000 mm² detector is 16% more efficient for a 25 mm diameter sample than for a 47 mm diameter sample with a sample to detector spacing of 10 mm.

$$G = \frac{1}{2}\left[\frac{R_D^2}{D(D+H)}\right] - \frac{3}{16}\frac{R_S^2 R_D^2 H}{D^5} + \frac{5}{32}\frac{R_S^4 R_D^2 H}{D^9}\left[H^2 - \frac{3}{4}R_D^2\right]$$ Equation 2

(Reference for the formula: J. L. GASCÓN, A. MUÑOZ: OPTIMIZATION OF THE PARAMETERS AFFECTING THE SOLID-STATE DEFECTOR EFFICIENCY)
where:
G is the geometry factor for predicting the efficiency with a sample of a given diameter;
$R_D$ is the radius of the detector array;
$R_S$ is the radius of the sample/source;
H is the distance from the sample/source to the detector;
D is the calculated distance from the center of the sample/source to the outer edge of the detector:

$$D = \sqrt{H^2 + R_D^2}$$ Equation 3:

With the known detectors, to optimize the detection levels for a 25 mm sample, a detector/system suited for a 47 mm samples cannot be used; a dedicated size appropriate detector/system needs to be used. Embodiments of this presentation allow for a single system/detector array to be most efficient for both 25 mm and 47 mm samples, albeit employing different sensing segments of the detector array. A lapel sample can be defined as a sample worn by an individual that simulates the air taken into the lungs to measure exposure to certain elements and their nuclides.

According to embodiments of this presentation, spectral acquisition is performed with independent signal chains, each signal chain comprising a radiation sensing surface segment ($14_1$, $14_2$, $14_3$) connected to a corresponding sensor circuit ($16_1$, $16_2$, $16_3$), itself connected to a corresponding signal processing circuit ($24_1$, $24_2$, $24_3$). Each segment has the same sensing surface area, though in different shapes and locations. Advantageously, a multi-segment detector array such as illustrated in FIG. 1 enables a lower-level electronic threshold than a single detector of the same size.

A traditional method of measuring low level alpha/beta samples is a gas flow proportional detector. A 20 cm² diameter Gas flow proportional detector has an effective threshold of ~25 keV. An equivalently sized silicon detector has an effective threshold of 75-125 keV, which is worse as the lower the threshold, the better. A silicon detector with a 20 cm² active area has a typical detector capacitance of >400 pf. On another hand, a silicon detector of ≤700 mm² has a capacitance of <300 pF, which allows energy thresholds of ≤25 keV that match (or improve upon) that of the larger gas flow proportional detector.

A 20 cm² detector according to embodiments of this presentation, incorporating three (3) equal radiation sensing surface segments ($14_1$, $14_2$, $14_3$), can lead to detector capacitances of 150-300 pF enabling energy thresholds of ≤25 keV which effectively improve upon that of the larger gas flow proportional detector. Thus, larger detector arrays using more segments but continuing to adhere to the ≤700 mm² per radiation sensing surface segment rule of thumb allows the detector size to be scaled to larger detection areas (See FIG. 6).

The integrated background noise of a detector according to embodiments of this presentation using fewer than all its sensing surface segments will yield less background noise than the total background from the entire array or from a single, larger detector the same size as the array. For optimum performance, the detection area used for a detector according to embodiments of this presentation should preferably not be too large relative to the sample size.

As outlined above, counting efficiency decreases with the increase of the ratio of the active area of the sample to the surface area of a detector. Thus, a detector array according to embodiments of this presentation using only segments) that most closely match the size and location of the sample will have a higher efficiency than a detector array using other segments that do not match the size and location of the sample. For optimum performance, the detection area used when operating a detector according to embodiments of this presentation in detection mode should be of the same size order as the sample to be measured. Samples can have diameters of 25 mm to 125 mm. A most common sample diameter is 50 mm.

As detailed above, the MDA for each segment depends on the background noise and the efficiency measured for each segment or combination of segments. Embodiments of this presentation thus provide, in a calibration mode, for measuring the background noise of each segment and combination of segments of the detector, then measuring for any given calibration sample size the efficiency of each segment and combination of segments. This allows calculating for each sample size the MDA of each segment and combination of segments. As will be detailed hereafter, a different MDA can be calculated for each type of radiation detected by each segment. According to embodiments of this presentation, signal processor arrangement 22 can display to a user each calculated MDA for a given radiation. In a further mode of operation where a sample emitting a radiation of interest to be measured and having a given size is presented to the detector instead of a calibration sample, this allows the user to command the processor arrangement 22 to display only the radiation measurements provided by the segment or combination of segments having the lowest MDA for the given size for the radiation of interest. In other words, integrating only the data from a selected segment or combination of segments allows for an optimum detection capability using the highest efficiency combination with lower than total array background noise.

According to embodiments of this presentation, processor arrangement 22 can be provided to, in the second mode of operation, automatically display only the radiation measurements provided by the segment or combination of segments having the lowest calculated MDA for the given size for the radiation of interest.

In its simplest form with a three-segment detector, there would be seven combinations results of MDA per radiation type (alpha or beta) that could be analysed to determine the best combination of segments to provide the lowest detection MDA. The possible combinations for alpha are shown:

$$\frac{\frac{K^2}{T_S} + 2K\sqrt{\frac{R_{B\alpha1}}{T_S} + \frac{R_{B\alpha1}}{T_B}}}{\varepsilon_{\alpha1}}$$

$$\frac{\frac{K^2}{T_S} + 2K\sqrt{\frac{R_{B\alpha2}}{T_S} + \frac{R_{B\alpha2}}{T_B}}}{\varepsilon_{\alpha2}}$$

$$\frac{\frac{K^2}{T_S} + 2K\sqrt{\frac{R_{B\alpha1} + R_{B\alpha2}}{T_S} + \frac{R_{B\alpha1} + R_{B\alpha2}}{T_B}}}{\varepsilon_{\alpha1} + \varepsilon_{\alpha2}}$$

$$\frac{\frac{K^2}{T_S} + 2K\sqrt{\frac{R_{B\alpha1} + R_{B\alpha3}}{T_S} + \frac{R_{B\alpha1} + R_{B\alpha3}}{T_B}}}{\varepsilon_{\alpha1} + \varepsilon_{\alpha3}}$$

$$\frac{\frac{K^2}{T_S} + 2K\sqrt{\frac{R_{B\alpha1} + R_{B\alpha2} + R_{B\alpha3}}{T_S} + \frac{R_{B\alpha1} + R_{B\alpha2} + R_{B\alpha3}}{T_B}}}{\varepsilon_{\alpha1} + \varepsilon_{\alpha2} + \varepsilon_{\alpha3}}$$

$$\frac{\frac{K^2}{T_S} + 2K\sqrt{\frac{R_{B\alpha2} + R_{B\alpha3}}{T_S} + \frac{R_{B\alpha2} + R_{B\alpha3}}{T_B}}}{\varepsilon_{\alpha2} + \varepsilon_{\alpha3}}$$

$$\frac{\frac{K^2}{T_S} + 2K\sqrt{\frac{R_{B\alpha3}}{T_S} + \frac{R_{B\alpha3}}{T_B}}}{\varepsilon_{\alpha3}}$$

Where:
$R_{B\alpha1}$=Rate of Alpha Background from segment 1
$R_{B\alpha2}$=Rate of Alpha Background from segment 2
$R_{B\alpha3}$=Rate of Alpha Background from segment 3
$\varepsilon\alpha1$=Alpha efficiency of segment 1
$\varepsilon\alpha2$=Alpha efficiency of segment 2
$\varepsilon\alpha2$=Alpha efficiency of segment 3
Simultaneously, optimum beta MDA would be determined. The possible combinations for beta are shown:

$$\frac{\frac{K^2}{T_S} + 2K\sqrt{\frac{R_{B\beta1}}{T_S} + \frac{R_{B\beta1}}{T_B}}}{\varepsilon_{\beta1}}$$

$$\frac{\frac{K^2}{T_S} + 2K\sqrt{\frac{R_{B\beta2}}{T_S} + \frac{R_{B\beta2}}{T_B}}}{\varepsilon_{\beta2}}$$

$$\frac{\frac{K^2}{T_S} + 2K\sqrt{\frac{R_{B\beta1} + R_{B\beta2}}{T_S} + \frac{R_{B\beta1} + R_{B\beta2}}{T_B}}}{\varepsilon_{\beta1} + \varepsilon_{\beta2}}$$

$$\frac{\frac{K^2}{T_S} + 2K\sqrt{\frac{R_{B\beta1} + R_{B\beta3}}{T_S} + \frac{R_{B\beta1} + R_{B\beta3}}{T_B}}}{\varepsilon_{\beta1} + \varepsilon_{\beta3}}$$

$$\frac{\frac{K^2}{T_S} + 2K\sqrt{\frac{R_{B\beta1} + R_{B\beta2} + R_{B\beta3}}{T_S} + \frac{R_{B\beta1} + R_{B\beta2} + R_{B\beta3}}{T_B}}}{\varepsilon_{\beta1} + \varepsilon_{\beta2} + \varepsilon_{\beta3}}$$

$$\frac{\frac{K^2}{T_S} + 2K\sqrt{\frac{R_{B\beta2} + R_{B\beta3}}{T_S} + \frac{R_{B\beta2} + R_{B\beta3}}{T_B}}}{\varepsilon_{\beta2} + \varepsilon_{\beta3}}$$

$$\frac{\frac{K^2}{T_S} + 2K\sqrt{\frac{R_{B\beta3}}{T_S} + \frac{R_{B\beta3}}{T_B}}}{\varepsilon_{\beta3}}$$

Where:
$R_{B\beta1}$=Rate of Beta Background from segment 1
$R_{B\beta2}$=Rate of Beta Background from segment 2
$R_{B\beta3}$=Rate of Beta Background from segment 3
$\varepsilon\beta1$=Beta efficiency of segment 1

εβ2=Beta efficiency of segment 2
εβ2=Beta efficiency of segment 3

As outlined above, it is known to use discrimination methods within a single measurement to differentiate between different types of radiation (e.g. Alpha and Beta simultaneously), According to embodiments of this presentation, each segment 14i is provided to receive radiations from at least two types (e.g. alpha and beta) and the sensor circuit 16i connected to the segment is provided for outputting an analog signal for each received radiation type. It is noted that the two analog signals can comprise spikes of distinct height sent on a same line. Each signal processing circuit 24i can then be provided to receive and process the two analog signals issued by its sensor circuit 16i to generate spectral data for each segment. Data cart then be further divided and saved into distinct channels to allow for nuclide identification under certain circumstances. Spectral data can thus be saved for each segment for each radiation type measured. Alpha and beta radiation for example can be measured concurrently using pulse height analysis, in which case beta integrals and alpha Integrals can be computed on the spectrums of the calibration samples (in calibration mode) and on the spectrums of the measured samples (in measurement mode). Pulse height analysis can be defined as a measurement technique where the electronic signal's voltage peak is proportional to the emission energy.

In embodiments where at least two radiation types are measured, in calibration mode the signal processor arrangement 22 uses the processed first and second analog signals associated to the two radiation types to determine a MDA for each radiation type for each radiation sensing segment and each combination of the radiation sensing segments, for each size of calibration sample. The processor arrangement 22 can then display the calculated MDAs for each radiation type to allow a user to select, for each radiation, the segment or combination of segments having the lowest MDA for a sample to be measured having a given size. Alternatively, the processor arrangement 22 can automatically display, for each radiation, the radiation measurements obtained only by the segment or combination of segments having the lowest MDA for a sample to be measured having a given size.

The Inventors have noted that each segment or combination of segments of a detector array or detector according to embodiments of this presentation has independent responses for each radiation type. Thus, different segments or combinations of segments of a detector array may be used for measuring different radiations emitted by a same sample.

According to embodiments of this presentation, the decision of what segment or combination of segments are to be used for measuring a type of radiation from a sample can be up to the end user. According to an embodiment of this presentation, no disregarded measurement data from a segment is discarded; all measurement are stored. Thus, the end user can eventually use any or all segments to reconstruct analysis results or to check the continued integrity of each segment and associated circuit.

According to embodiments of this presentation, the "best" result can be calculated by using a selectable/configurable calculated MDA value to be applied to combinations of segments and may be specific to each sample type, procedure, or even to an individual sample depending on the variable. The background noise results of each segment can be determined empirically. According to embodiments of this presentation, the efficiency results can be measured; or, alternatively, in a case where a standard of a same sample geometry isn't used, the efficiency can be calculated using Monte Carlo N-Particle transport modeling code, and mathematical geometry templates.

The Inventors have noted that a detector according to embodiments of this presentation improve detection capabilities for a given analysis time. This allows either lower detection values for a pre-determined analysis time, or a shorter analysis time to reach a required detection level.

As outlined above, the various radiation sensing surface segments of a semiconductor detector according to embodiments of this presentation have each a capacitance lower than the capacitance of a known semiconductor radiation sensing surface of same size as the combined sizes of the segments. It follows that the measurement threshold of each segment of a detector according to this presentation can be set lower than the measurement threshold of a known detector of a size equal to the combined sizes of the segments, due to less electronic noise produced by multiple smaller detector segments versus a single large detector surface.

Further to the above considerations, a detector according to embodiments of this presentation is particularly resistant due to a built-in-redundancy. Indeed, a damaged or contaminated segment may not make the detector inoperable. Simply, the damage segment will show a poor MDA during calibration and will not be selected.

According to embodiments of this presentation segment results that are unused can be useful as a crosscheck on the segments that are used in the analysis. Further, segment results can be used to crosscheck sample homogeneity of laboratory chemistry processes. All the segments of the detector array can be calibrated even if they are not used for an optimum setup. All the segments of the detector should individually yield a same calculated activity result within statistical variations. This can be verified either by manually comparing the results from each segment or through a computer algorithm. In cases where the individual segments' results do not overlap, the user would be prompted to investigate why.

It is well established in literature that a smaller detector yields a lower (e.g. better) resolution than a larger detector, all other factors being equal. The primary reasons for this include lower capacitance and the angles at which the alpha particles strike the detector. By the same principles, individual segments may offer improvements in resolution over a single detector of the same size as the detector array.

As a qualitative instrument, gas filled alpha/beta counters traditionally have been used to determine the amount of radioactivity present with the only discrimination possible being the separation between alpha and beta radiations. With the resolution improvement afforded by a silicon detector array according to this presentation, quantitative measurements can be attempted with the goal of excluding nuclides (e.g. radon progeny), confirming the presence of nuclides expected to be found in a sample, or identifying nuclides on a sample of unknown origin. Using the spectroscopic capabilities of a detector according to this presentation, the quantitative measurements can be augmented by the qualitative results from one or more segments.

As outlined above, the semiconductor radiation sensing surface 12 of a detector according to embodiments of this presentation forms a simple geometric shape and each radiation sensing surface segment 14i, where i=1 . . . N and N>=2, forms 1/Nth of the semiconductor radiation sensing surface. According to embodiments of this presentation, the semiconductor radiation sensing surface 12 forms a circle, and each radiation sensing surface segment forms a sector having ⅓ of the surface of said circle.

Figure 2:
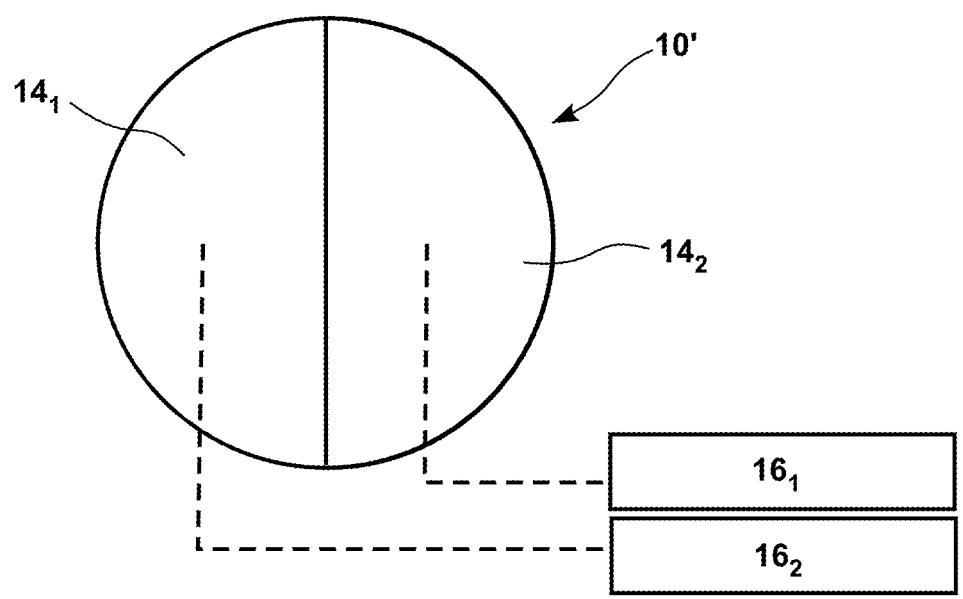
FIG. 2 illustrates schematically a radiation detector according to an embodiment of this presentation.

FIG. 2 illustrates schematically a radiation detector 10' according to an embodiment of this presentation wherein the semiconductor radiation sensing surface 12 forms a circle, that is identical to detector 10 of FIG. 1, except that N=2 and each of the two radiation sensing surface segments $14_1$, $14_2$ forms a semicircle or half-circle sector. An advantage of a multi-segment detector (e.g. two segments, as illustrated in FIG. 2) over a single detector of the same size is that each segment can be set to a lower threshold and/or have lower electronic noise than that of the single detector.

Figure 3:
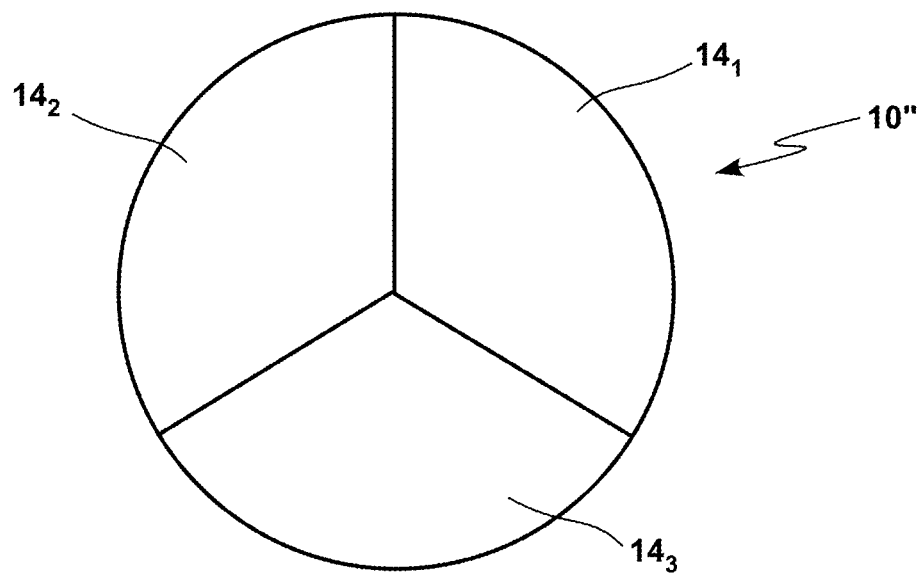
FIG. 3 illustrates schematically the sensing surface of a radiation detector according to an embodiment of this presentation.

FIG. 3 illustrates schematically the sensing surface of a radiation detector 10" according to an embodiment of this presentation, that is identical to detector 10' of FIG. 2, except that N=3 and each of the three radiation sensing surface segments $14_1$, $14_2$, $14_3$ forms a ⅓ circle sector. As in FIG. 2, each segment in FIG. 3 has a same efficiency and a same background noise.

Figure 4:
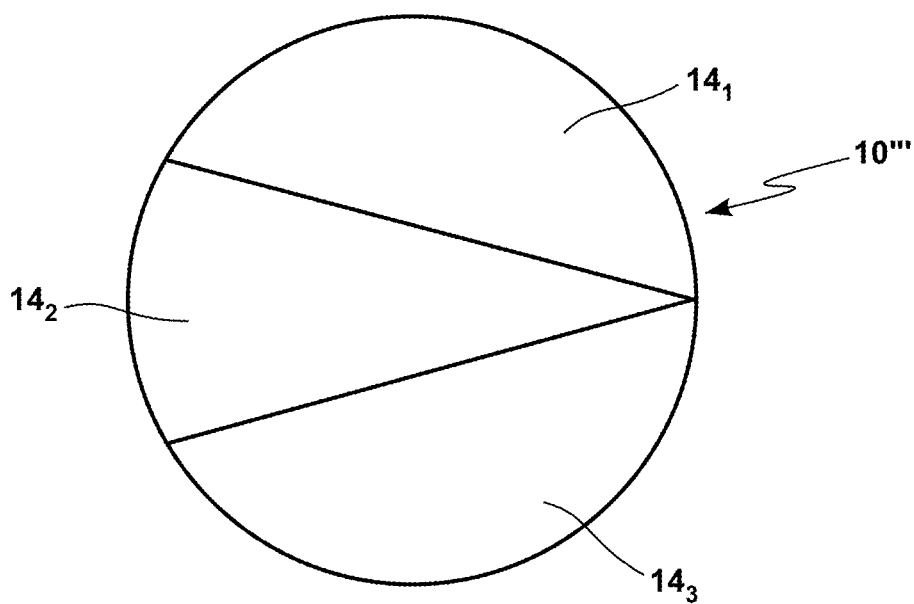
FIG. 4 illustrates schematically the sensing surface of a radiation detector according to an embodiment of this presentation.

FIG. 4 illustrates schematically the sensing surface of a radiation detector 10''' according to an embodiment of this presentation, that is identical to detector 10" of FIG. 2, except that instead of forming each a ⅓ of a circle sector, the three radiation sensing surface segments $14_1$, $14_2$, $14_3$ form respectively two circle caps and a wedge separating the two circle caps.

Figure 5:
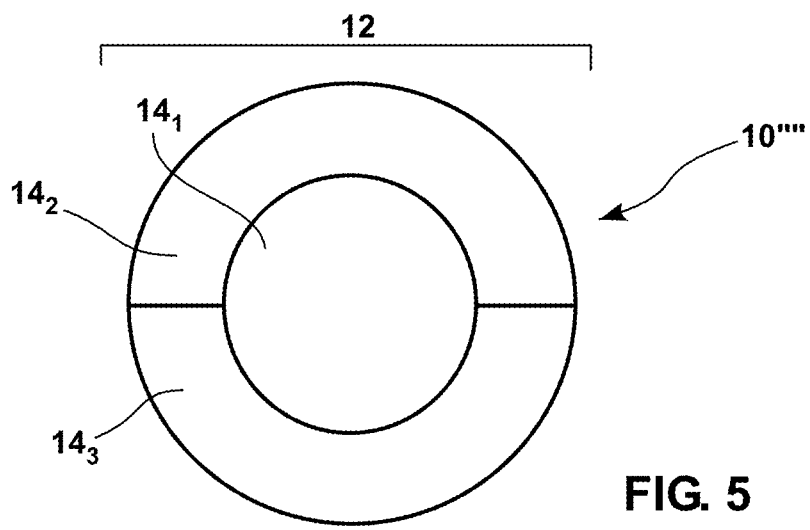
FIG. 5 illustrates schematically the sensing surface of radiation detector according to an embodiment of this presentation.

FIG. 5. illustrates schematically the sensing surface of a radiation detector 10'''' according to an embodiment of this presentation, that is identical to detector 10" of FIG. 2, except that instead of forming each a ⅓ of a circle sector, a first radiation sensing surface segment $14_1$ forms a sub-circle having the same center as surface 12, and the other radiation sensing surface segments $14_2$, $14_3$ form each a sector constituting half of a ring having the same center as surface 12.

Figure 6:
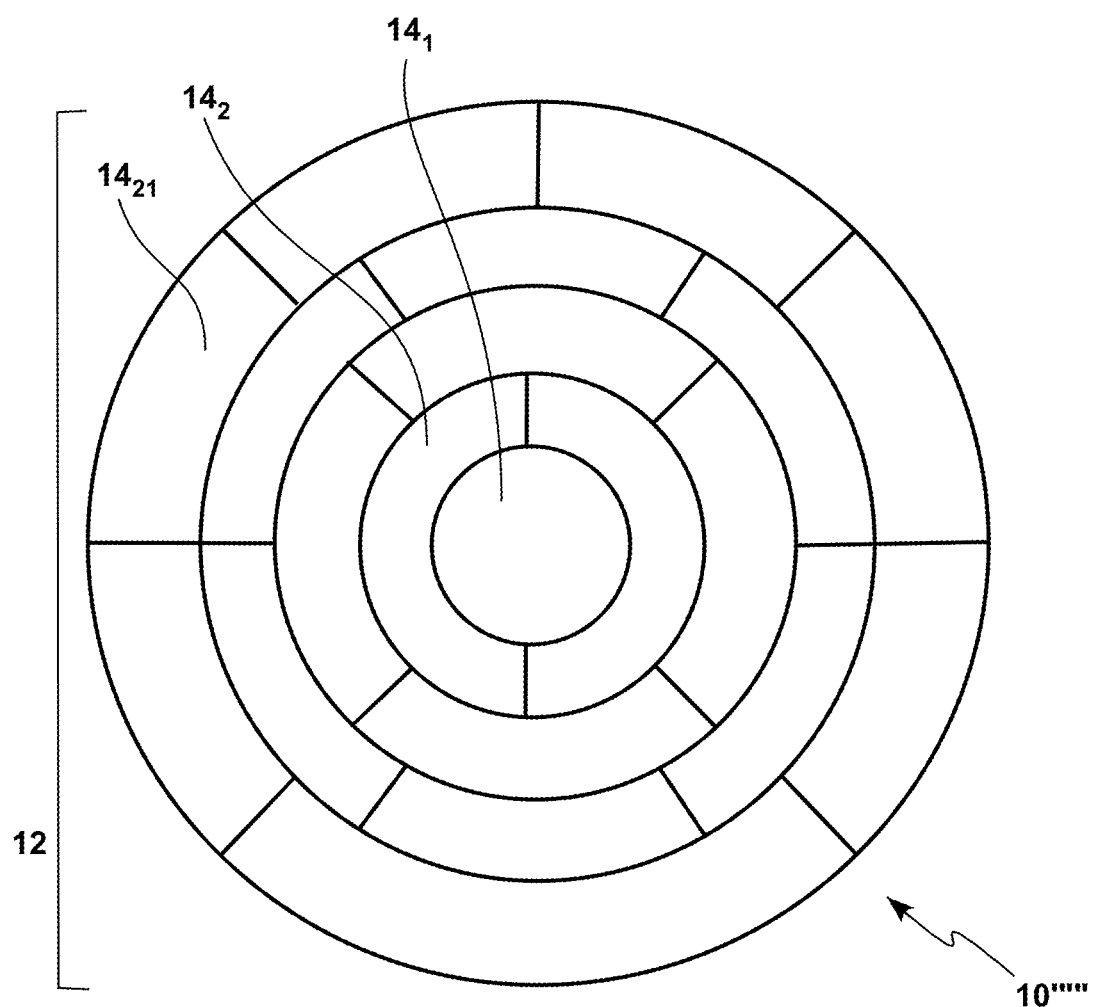
FIG. 6 illustrates schematically the sensing surface of a radiation detector according to an embodiment of this presentation.

FIG. 6 illustrates schematically the sensing surface of a radiation detector 10''''' according to an embodiment of this presentation, that is identical to detector 10'''' of FIG. 5, except that N=21 instead of N=3; a first radiation sensing surface segment $14_1$ forming a sub-circle having the same center as surface 12, and the other radiation sensing surface segments $14_2$ to $14_{21}$ form each a sector of concentric rings having the same center as surface 12.

Figure 7:
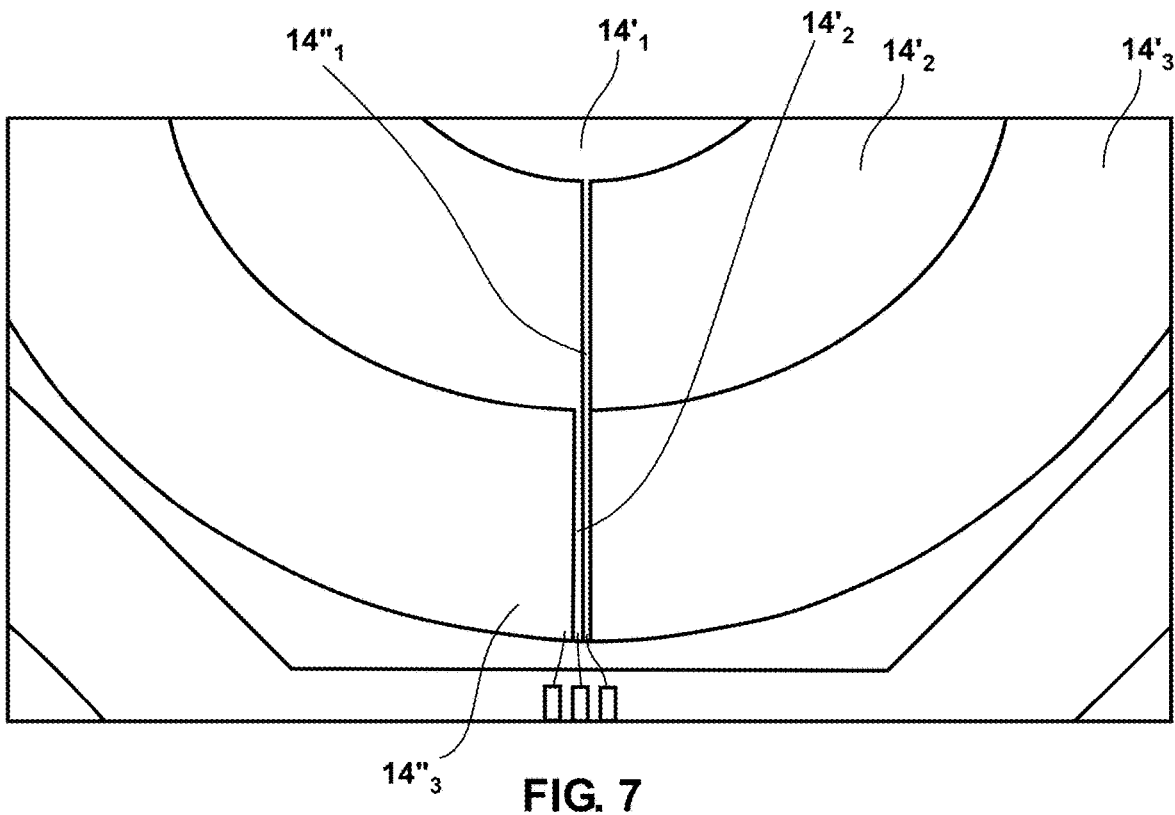
FIG. 7 illustrates schematically the signal conductors of the sensing surface of a radiation detector according to an embodiment of this presentation.

FIG. 7 illustrates schematically the signal conductors of the sensing surface 12 of radiation detector 10 of FIG. 1. As detailed in relation with FIG. 1, surface 12 forms a circle, segment $14_1$ forms a sub-circle having the same center as surface 12 and the other radiation sensing surface segments $14_2$, $14_3$ form concentric rings having the same center as surface 12. According to embodiments of this presentation, each radiation sensing surface segment $14_1$, $14_2$, $14_3$ comprises a sensing conductor segment $14'_1$, $14'_2$, $14'_3$ forming a conductive sensing surface, respectively connected electrically to a signal conductor segment $14''_1$, $14''_2$, $14''_3$; the sensing and signal conductors of all the radiation sensing surface segments being coplanar. According to embodiments of this presentation, a further electrical connection, for example using wire bonding, can be made between the signal conductor segment $14''_1$, $14''_2$, $14''_3$; and the respective sensor circuits $16_1$, $16_2$, $16_3$ (not shown FIG. 7). Of note, in the illustration of FIG. 7, as sensing conductor segment $14'_3$ essentially forms an outer ring of surface 12, signal conductor segment $14''_3$ is not distinct from sensing conductor segment $14'_3$.

Figure 8:
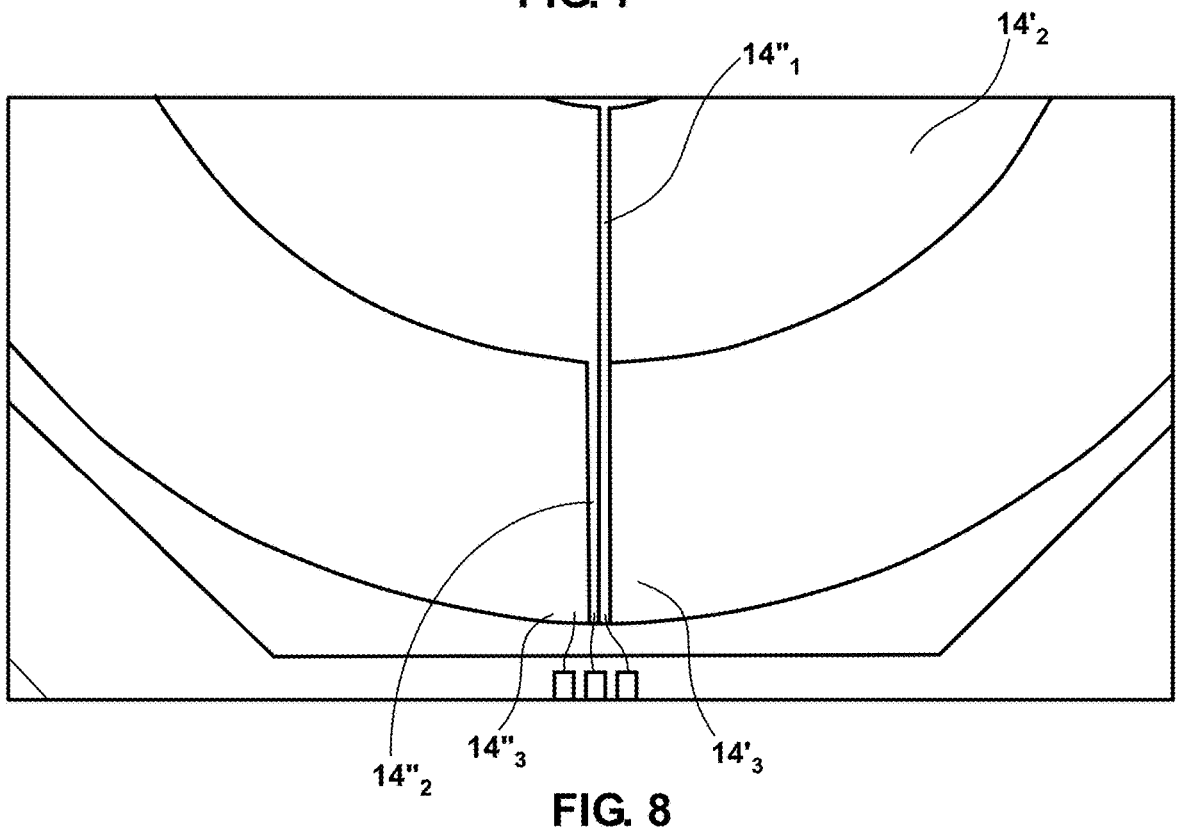
FIG. 8 illustrates in more detail the signal conductors of the sensing surface of a radiation detector according to an embodiment of this presentation.

FIG. 8 illustrates in more detail the signal conductors $14''_1$, $14''_2$, $14''_3$ and illustrate that in order to let the signal conductors $14''_1$ and $14''_2$ pass, sensing conductor segments $14'_2$ and $14'_3$ do not have the shape of a full ring, rather a ring with a thin radial cut that let the passage of respectively signal conductor $14''_1$ and signal conductors $14''_1$ and $14''_2$. As illustrated in FIG. 8, according to embodiments of this presentation, each signal conductor $14''_1$, $14''_2$, $14''_3$ is adjacent to at least another signal conductor. A fan out geometry such as illustrated in FIGS. 7 and 9 allows the bull's eye/concentric circles variant of a detector according to this presentation to be free of bonding wires or of Printed Circuit Board material under most of the surface of the segments.

Figure 9:
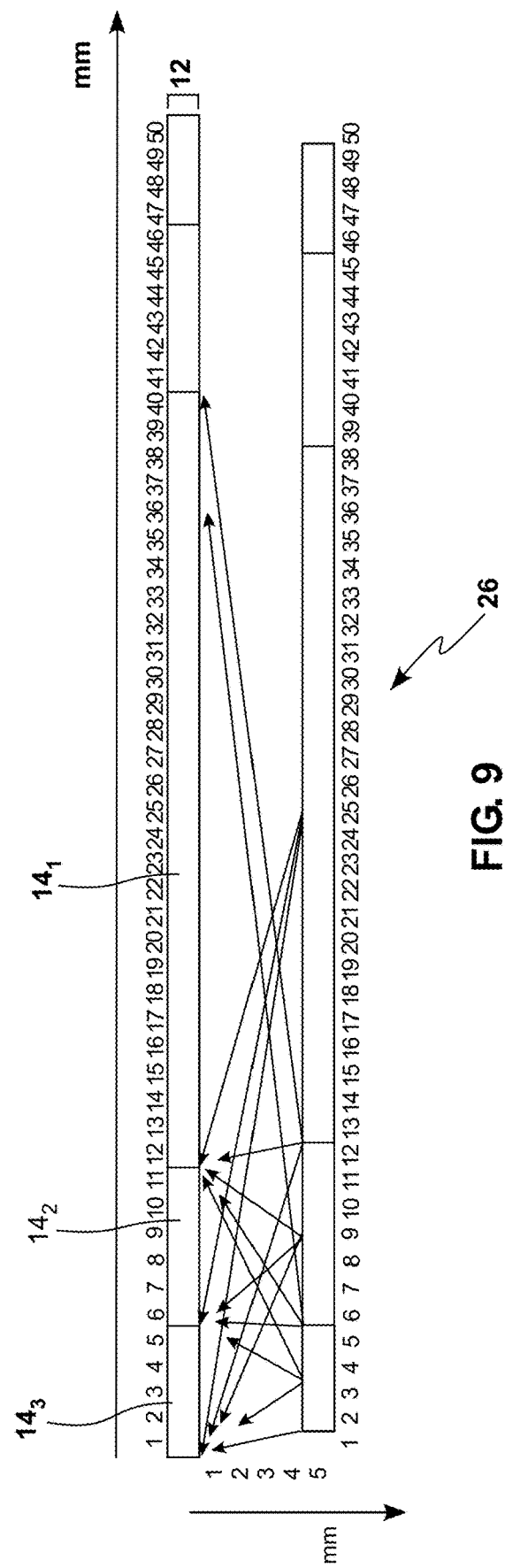
FIG. 9 illustrates the radiation path between a sample of various size and the sensing surface of a radiation detector according to an embodiment of this presentation.

FIG. 9 is a cross section drawing that illustrates schematically different integration angles/radiation paths between a sample 26 having three possible sizes of 27, 40 and 47 mm in diameter and the sensing surface segments $14_1$, $14_2$, and $14_3$ (having respectively outer diameters of 29, 41 and 50 mm) of sensing surface 12 of a detector 10 as illustrated in FIG. 1, located 5 mm away from the sample 26. In a three segment detector such as shown in FIG. 1, it has been observed that the center (e.g. 667 mm²) detector while only comprising 33% of the total detection area, detects 60% of the total counts from a sample the same size as the entire detector array. When the counts from the two center sections of such a "Bull's Eye" or "RAF" detector (FIG. 1) are combined, 84% of the total counts are observed.

Figure 10:
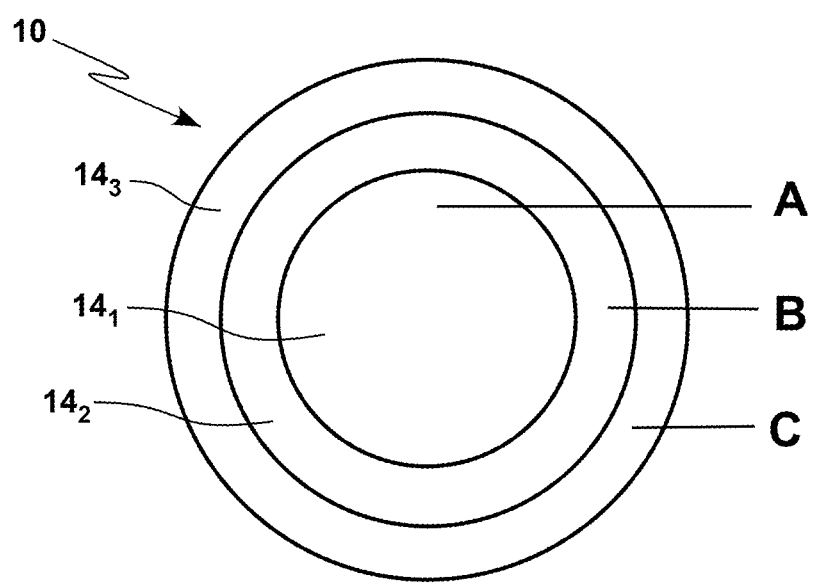
FIG. 10 illustrates schematically the sensing surface of a radiation detector according to an embodiment of this presentation.

FIG. 10 illustrates schematically the sensing surface segments $14_1$, $14_2$, and $14_3$ of a 2000 mm² detector 10 as illustrated in FIG. 1, and that are respectively referenced as segments A, B and C with respect to the tables in FIGS. 11 to 14 hereafter FIG. 11 is a table showing the background noise measurements for both alpha and beta radiations for segment A alone; segments A and B combined, and segments A, B and C combined. FIG. 11 also shows the efficiency for alpha and beta radiation for segment A alone; segments A and B combined, and segments A, B and C combined for a calibration sample of 1810 mm². It is noted that FIG. 11 does not indicate the background noise measurements or efficiencies for segments B, C alone or a combination of B and C or A and C as these measurements led to non-significative MDAs.

FIG. 12 is a table showing the MDAs calculated for both alpha and beta radiations for segment A alone; segments A and B combined, and segments A, B and C combined using a 100-minute count time on a 50 mm diameter (1963 mm²) sample in a laboratory instrument. It can be seen that in the exemplary detector used to generate the tables of FIG. 12, the lowest (best) MDA for alpha radiation is achieved for the combination of segments A, B and C whereas the lowest (best) MDA for beta radiation is achieved for the combination of segments A and B. As opposed to in-situ measurements that are taken in the place of interest, a grab sample is a sample that is taken to a laboratory for measurement.

FIG. 13 is a table showing the background noise and efficiency measurements of the detector of FIG. 10 with segment A made inoperative; and FIG. 14 is a table illustrating the MDA calculated for segment B and a combination of segments B and C, showing that usable MDAs can be achieved with detector 10 even if the central segment A is made inoperative. FIG. 14 further illustrates that, in this case also, different segments or segment combinations can be used for measuring the alpha and beta radiations.

Figure 15:
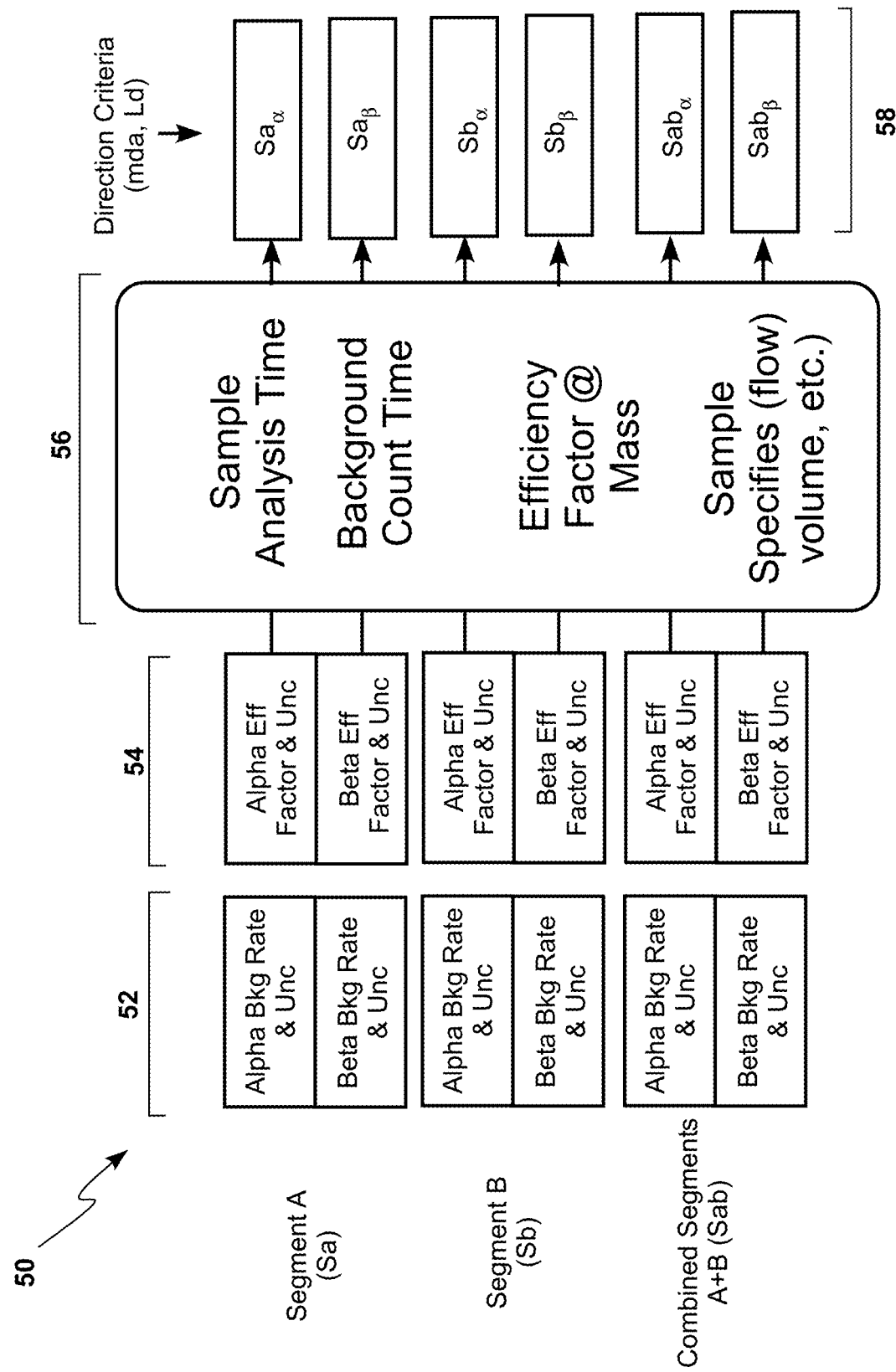
FIG. 15 illustrates steps of selection of a segment or combination of segments for detecting first and second types of radiation with a two-segments detector according to embodiments of this presentation.

As detailed above, a detector according to embodiments of this presentation, with segments shaped to optimize detection capabilities, provides the opportunity to fine-tune the detector to specific samples and unique conditions. The results can be manually selected or automatically selected through an algorithm. FIG. 15 illustrates steps of a method 50 of selection of a segment or combination of segments for detecting alpha and beta radiations with a two-segments detector (such as the detector 10 of FIG. 10, but with only segments A and B).

Method 50 comprises, at a first series of steps 52, measuring the background noise for all the radiations to be measured (alpha and beta radiations illustrated) for each segment and combination of segment of the detector (A, B, A+B). Method 50 comprises, at a second series of steps 54, measuring the detection efficiency for each segment and combination of segment of the detector for all the radiations to be measured. Method 50 comprises, at a third series of steps 56, using the background noise and efficiency, as well as additional data such as Sample analysis time and sample specifics, to calculate the MDA 58 for all the radiations to be measured (alpha and beta radiations illustrated) for each segment and combination of segment of the detector (A, B, A+B).

Figure 16:
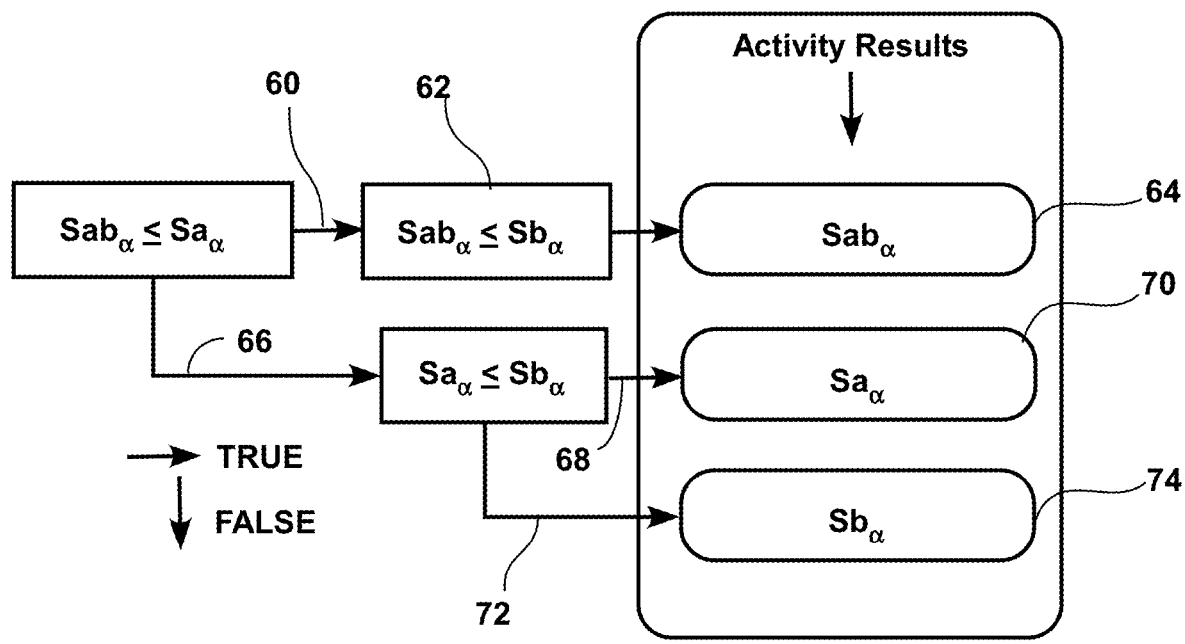
FIG. 16 illustrates steps of selection of a segment or combination of segments for detecting a first type of radiation with a two-segments detector according to embodiments of this presentation.

FIG. 16 illustrates steps of selection of a segment or combination of segments for detecting alpha radiation using the alpha MDA calculated with method 50 in FIG. 15:

If the alpha radiation MDA for the combination of segments A and B is smaller than or equal to the alpha radiation MDA for segment A (60), the alpha radiation MDA for the combination of segments A and B is compared to the alpha radiation MDA for segment B (62). Then, if the alpha radiation MDA for the combination of segments A and B is smaller than or equal to the alpha radiation MDA for segment B, the combination of segments A and B is used (64) to measure alpha radiation for a sample having a size the order of size of the calibration sample used for the method 50 measurements. Otherwise (66), if the alpha radiation MDA for segment A is smaller than or equal to the alpha radiation MDA for segment B (68), segment A is used to measure alpha radiation (70) for a sample of the order of the calibration sample used for the method 50 measurements. Otherwise, if the alpha radiation MDA for segment A is larger than the alpha radiation MDA for segment B (72), segment B is used to measure alpha radiation (74) for a sample of the order of the calibration sample used for the method 50 measurements.

Figure 17:
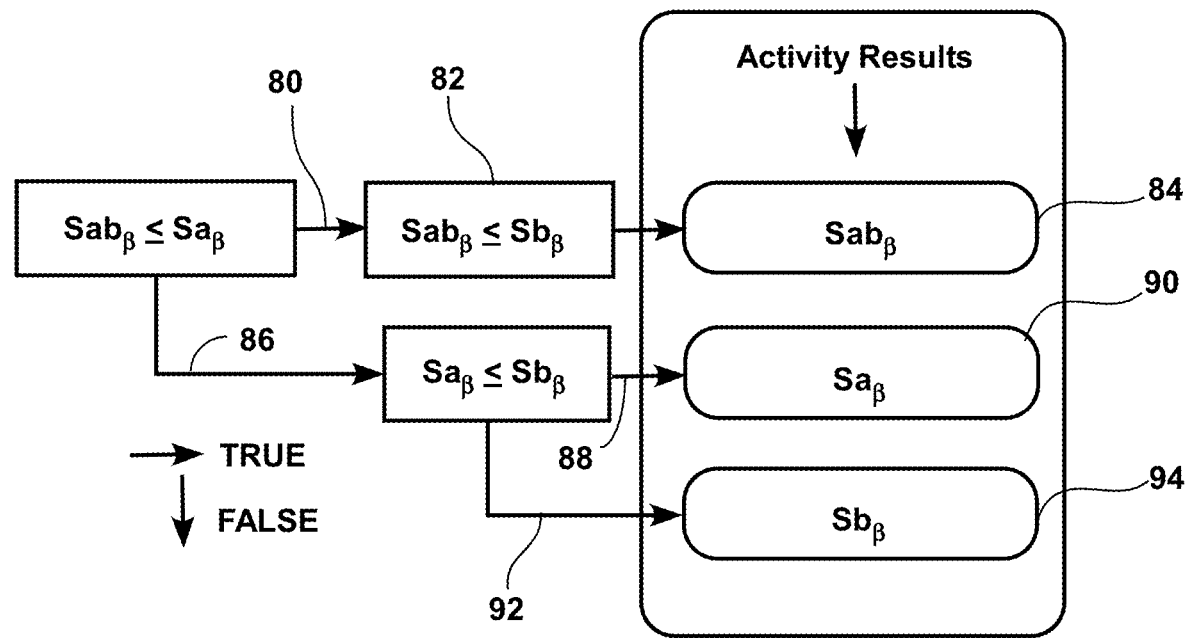
FIG. 17 illustrates steps of selection of a segment or combination of segments for detecting a second type of radiation with a two-segments detector according to embodiments of this presentation.

FIG. 17 illustrates steps of selection of a segment or combination of segments for detecting beta radiation using the alpha MDA calculated with method 50 in FIG. 15:

If the beta radiation MDA for the combination of segments A and B is smaller than or equal to the beta radiation MDA for segment A (80), the beta radiation MDA for the combination of segments A and B is compared to the beta radiation MDA for segment B (82). Then, if the beta radiation MDA for the combination of segments A and B is smaller than or equal to the beta radiation MDA for segment B, the combination of segments A and B is used (84) to measure beta radiation for a sample having a size the order of size of the calibration sample used for the method 50 measurements. Otherwise (86), if the beta radiation MDA for segment A is smaller than or equal to the beta radiation MDA for segment B (88), segment A is used to measure beta radiation (90) for a sample of same order of size as the calibration sample used for the method 50 measurements. Otherwise, if the beta radiation MDA for segment A is larger than the beta radiation MDA for segment B (92), segment B is used to measure beta radiation (94) for a sample of the order of the calibration sample used for the method 50 measurements.

Figure 18:
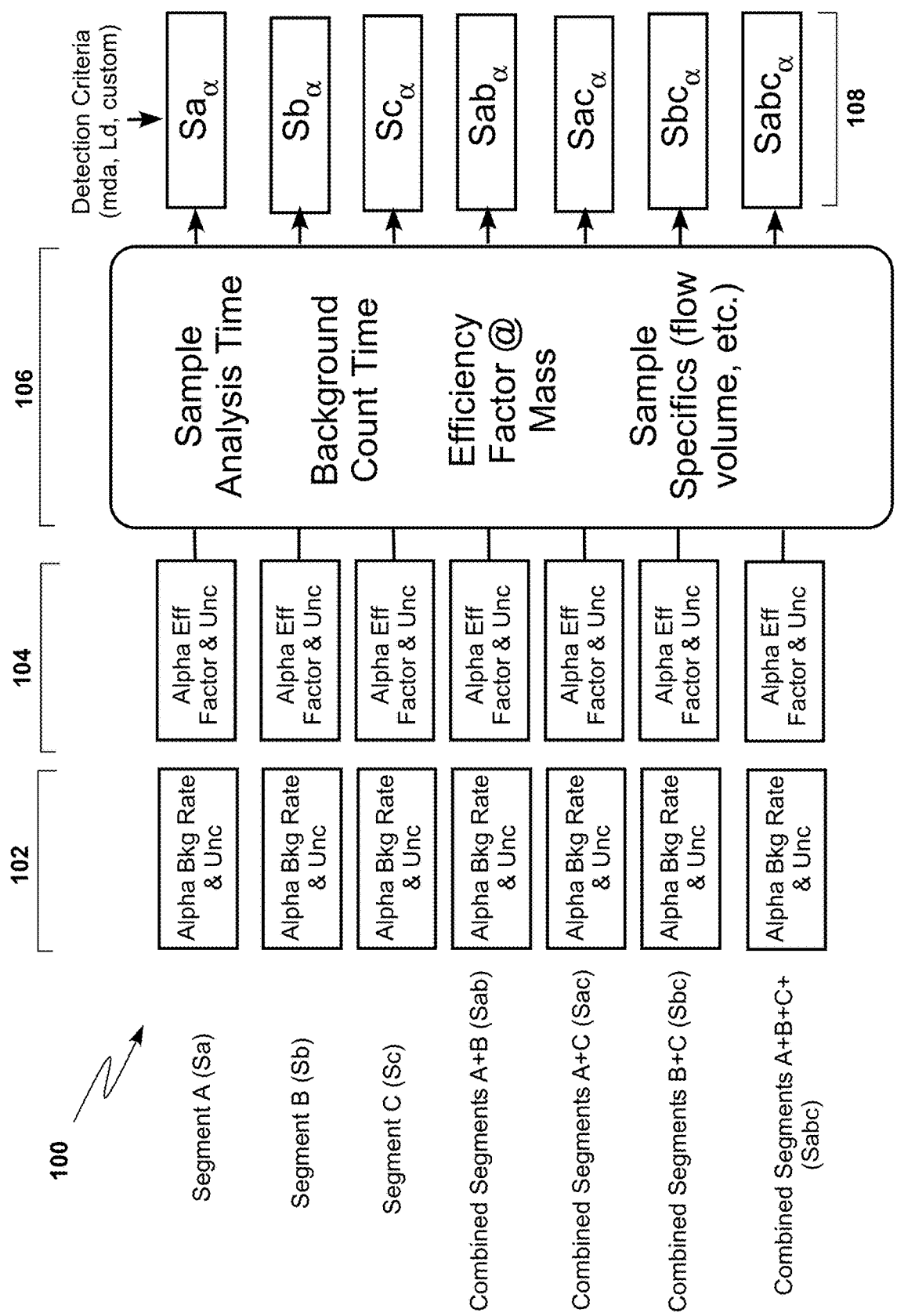
FIG. 18 illustrates steps of selection of a segment or combination of segments for detecting a first type of radiation with a three-segments detector according to embodiments of this presentation.

FIG. 18 illustrates steps of a method 100 of selection of a segment or combination of segments for detecting alpha radiations with a three-segments detector (such as the detector 10 of FIG. 10, with segments A, B and C).

Method 100 comprises, at a first series of steps 102, measuring the background noise for the radiation to be measured (alpha radiation) for each segment and combination of segment of the detector (A, B, C, A+B, A+C, 13+C, A+B+C). Method 100 comprises, at a second series of steps 104, measuring the detection efficiency for each segment and combination of segment of the detector for the radiation to be measured. Method 100 comprises, at a third series of steps 106, using the background noise and efficiency, as well as additional data such as Sample analysis time and sample specifics, to calculate the MDA 108 for the alpha radiation for each segment and combination of segment of the detector (A, C, A+B, A+C, B+C, A+B+C).

Figure 19:
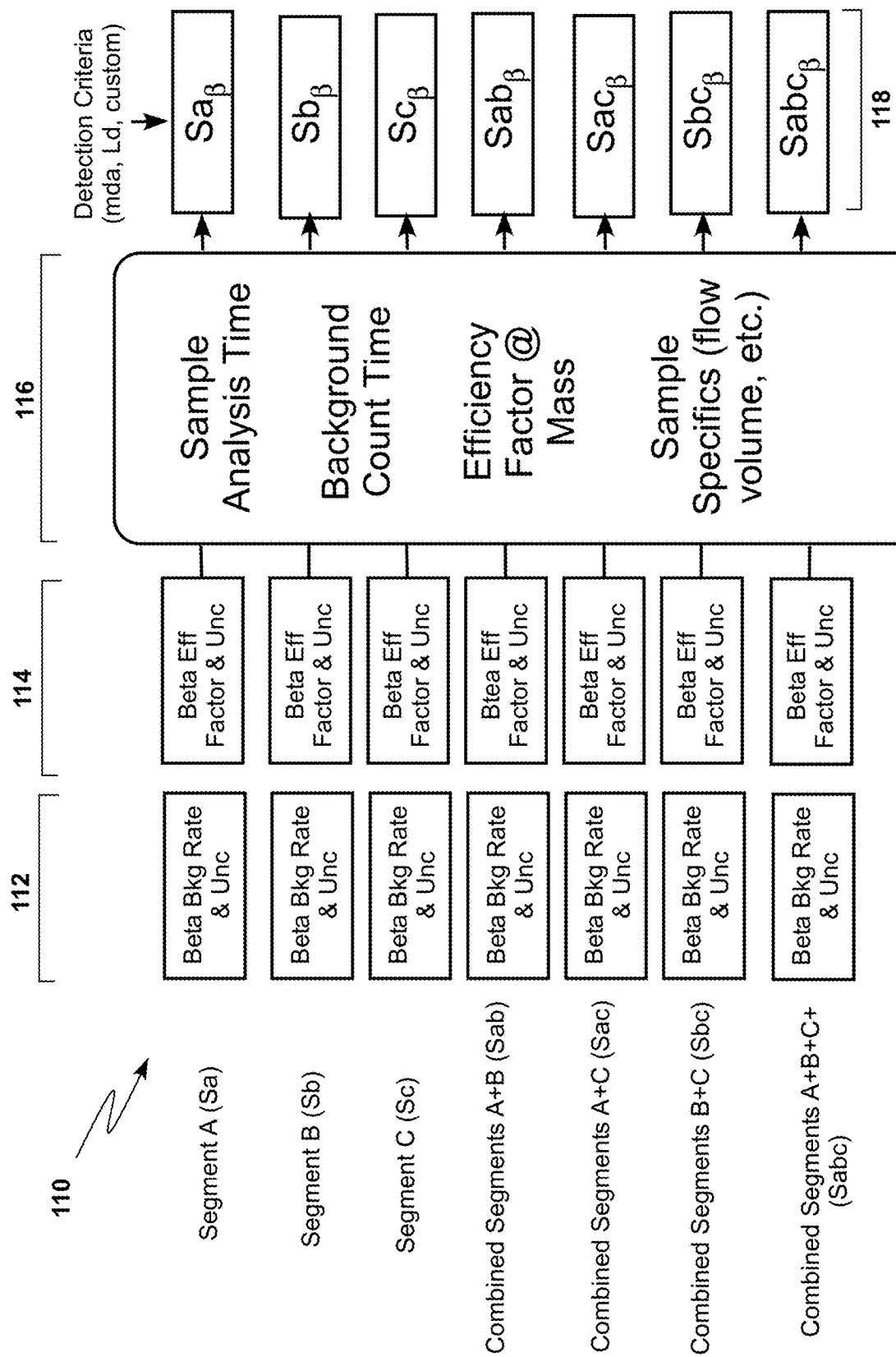
FIG. 19 illustrates steps of selection of a segment or combination of segments for detecting a second type of radiation with a three-segments detector according to embodiments of this presentation.

FIG. 19 illustrates steps of a method 110 of selection of a segment or combination of segments for detecting beta radiations with a three-segments detector such as the detector 10 of FIG. 10. Method 110 comprises, at a first series of steps 112, measuring the background noise for the radiation to be measured (beta radiation) for each segment and combination of segment of the detector (A, B, C, A+B, A+C, B+C, A+B+C). Method 110 comprises, at a second series of steps 114, measuring the detection efficiency for each segment and combination of segment of the detector for beta radiation. Method 110 comprises, at a third series of steps 116, using the background noise and efficiency, as well as additional data such as Sample analysis time and sample specifics, to calculate the MDA 118 for the beta radiation for each segment and combination of segment of the detector (A, B, C, A+B, A+C, B+C, A+B+C).

Figure 20:
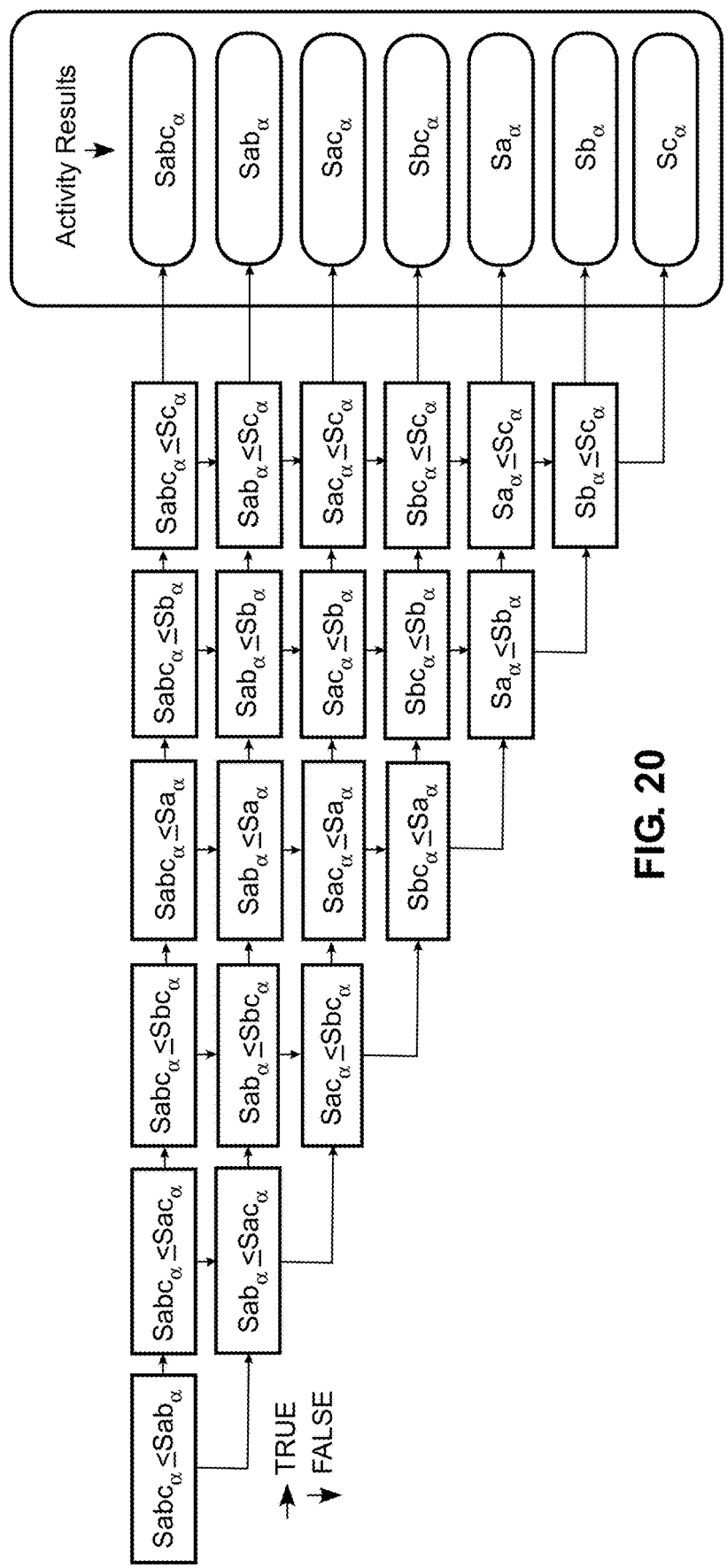
FIG. 20 illustrates steps of selection of a segment or combination of segments for detecting a first type of radiation with a three-segments detector according to embodiments of this presentation.

FIG. 20 illustrates steps of selection of a segment or combination of segments for detecting alpha radiation with a three-segments detector according to embodiments of this presentation. Similarly to the process described in relation to FIG. 16, the MDA 108 calculated using method 100 are compared, and the segment or combination of segments having the lowest MDA is chosen for measuring alpha radiation for a sample of a size of the same order as a calibration sample used during process 100.

Figure 21:
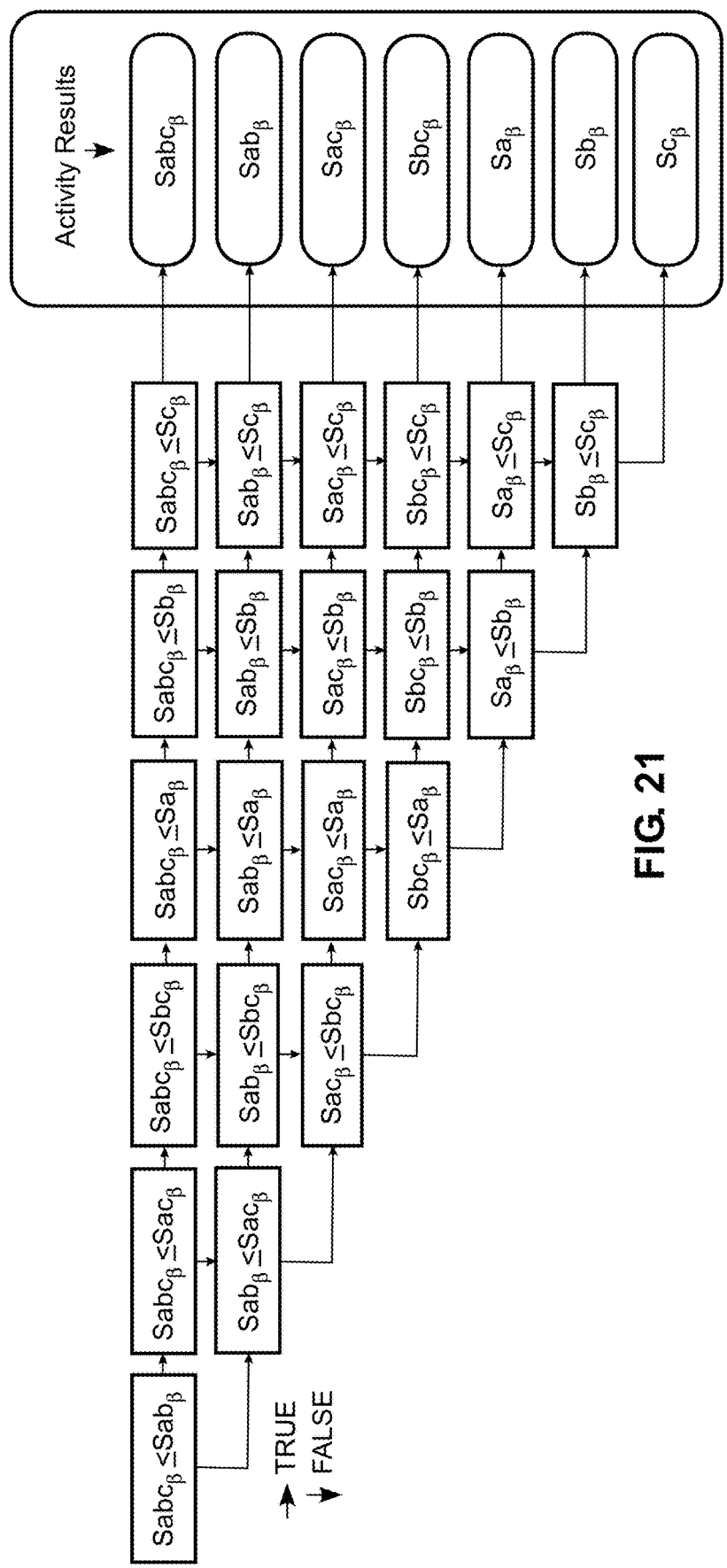
FIG. 21 illustrates steps of selection of a segment or combination of segments for detecting a second type of radiation with a three-segments detector according to embodiments of this presentation.

FIG. 21 illustrates steps of selection of a segment or combination of segments for detecting beta radiation with a three-segments detector according to embodiments of this presentation. Similarly to the process described in relation to FIG. 17, the MDA 118 calculated using method 110 are compared, and the segment or combination of segments having the lowest MDA is chosen for measuring alpha radiation for a sample of a size of the same order as a calibration sample used during process 110.

Figure 22:
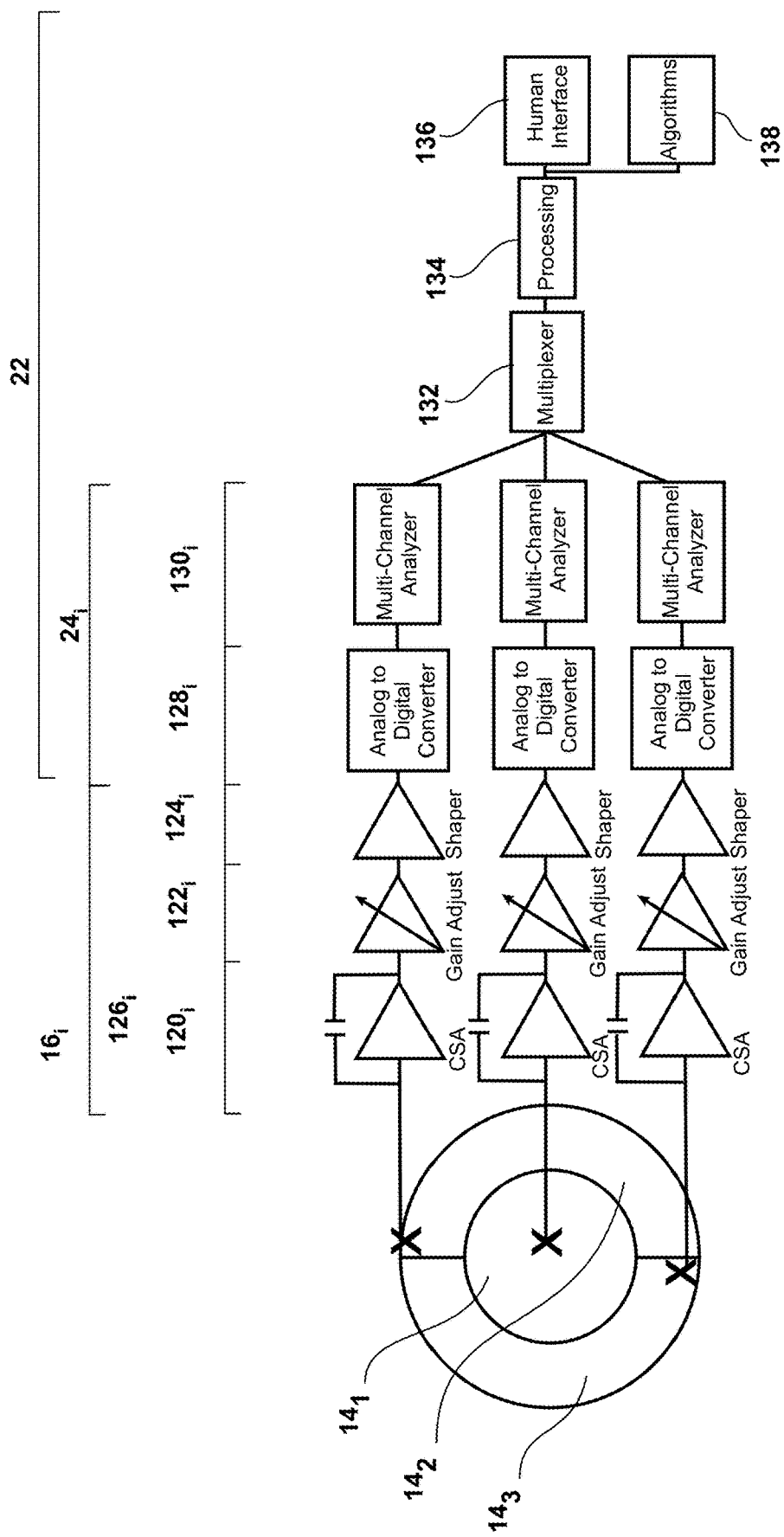
FIG. 22 illustrates in detail a sensor circuits and signal processor arrangement of a three-segments detector according to embodiments of this presentation.

FIG. 22 illustrates schematically a three-segment detector 10'''' as shown in FIG. 5, along with a sensor circuit $16_1$, $16_2$, $16_3$ and a signal processing circuit $24_1$, $24_2$, $24_3$ coupled to each segment $14_1$, $14_2$, $14_3$ of the three-segments detector according to embodiments of this presentation. In FIG. 22, each sensor circuit 16i (i=1-3) comprises a Charge Sensitive Amplifier 120i, having an input coupled to segment 14i and an output coupled in input of a variable gain amplifier 122i, itself coupled in input of a shaper circuit 124i; a capacitor 126i being coupled in parallel with CSA 120i, A charge Sensitive Amplifier can be defined as an electronic current integrator that produces a voltage output proportional to the integrated value of the input current, or the total Charge injected.

In FIG. 22, each signal processing circuit 24i (i=1-3) comprises an Analog to Digital converter circuit 128i, having an input coupled to the output of the shaper circuit 124i and an output connected in input of a Multi-Channel Analyzer (MCA) circuit 130i. An MCA circuit can be defined as an instrument or circuit used in laboratory and field applications, provided to analyze an input signal consisting of pulses.

According to an embodiment of this presentation, the signal processor arrangement 22 further comprises a multiplexer 132 for receiving the output of all the Multi-Channel Analyzers 130*i* and sending them sequentially to a processing device 134 capable of calculating the MDA for each segment or combination of segments, for example by implementing methods 50, 100 or 110 detailed above. Processing device 134 can comprise a computer with an adequate software or a dedicated integrated processor. Arrangement 22 can then be provided either for sending the results (MDAs) to a human interface 136 for display to a user or for sending the results (MDAs) to a further processing device arranged for determining what segment or combination of segments should be used for detection, for example using the processed detailed in FIGS. 16,17, 20, 21.

Figure 23:
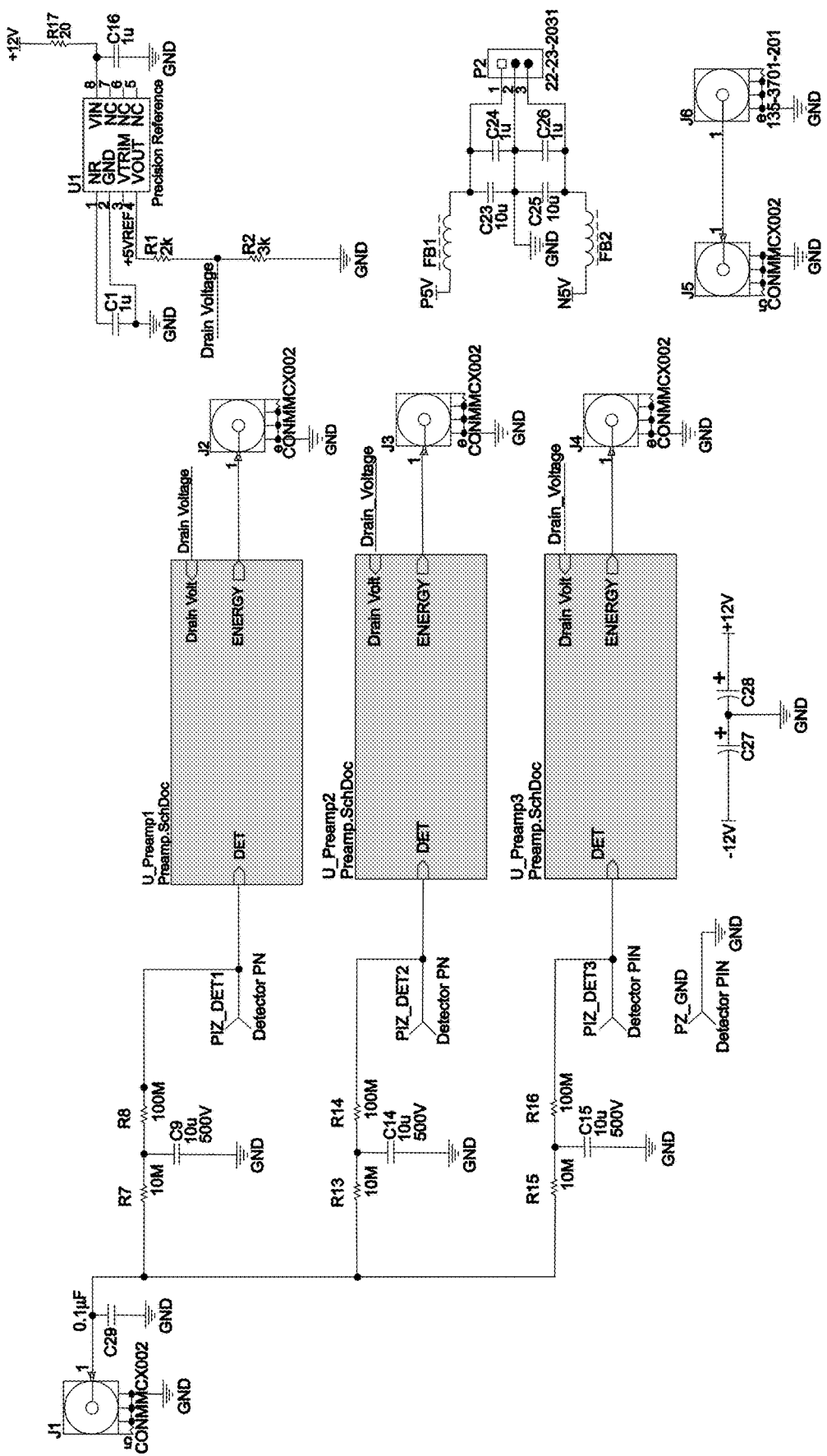
FIG. 23 illustrates a detail of the schematic of FIG. 22.

FIG. 23 illustrates a detail of the schematic of FIG. 22, where the gray boxes represent the CSAs of FIG. 22 and where the left side of the grey boxes shows an electronic representation of the physical detectors in a three-segment array embodiment.

Figure 24:
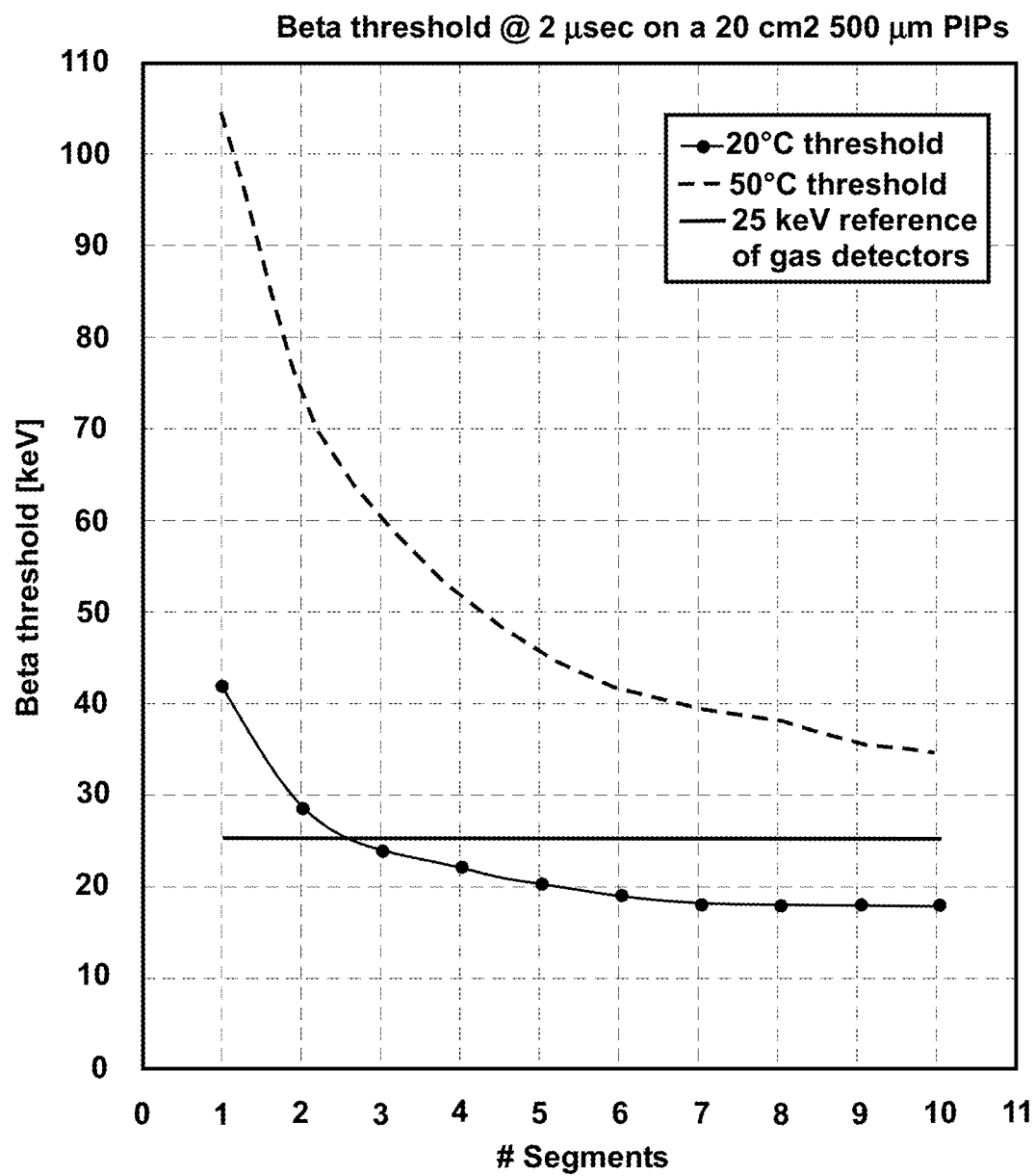
FIG. 24 illustrates the performances of radiation detectors according to embodiments of this presentation.

FIG. 24 illustrates the performances of radiation detectors according to embodiments of this presentation. As outlined above, smaller detectors/segments provide lower electronic noise, which allows for a lower threshold for improved (higher) beta/gamma efficiency (for example). FIG. 25 shows the threshold advantage measured on a 20 cm2 silicon detector array. It can be seen that, for a 20 degree Celsius threshold as well as for a 60 degree Celsius threshold, the (e.g. Beta) threshold decreases significantly with the number of segments in a detector according to this presentation. It can be seen that for example considering a 20 degree Celsius threshold, a three segments or more detector according to this presentation has a lower threshold than a gas detector having a same detection surface.

All segments of the detector have the same active area and are of complementary shapes designed as to maximize detection efficiency. As outlined above, a center segment usually has a higher geometric interaction with the sample than the other segments of the detector. Each segment having the same active area yields statistically equivalent background performance, but each segment yields a unique efficiency signature based on the size, shape, position and radiation type of interest in each sample in relation to the physical characteristics of an unknown sample. Unique combinations of segments can be utilized separately for each type of radiation measured to yield the most favorable (lower) detection levels specific to each sample and each radiation type.

There are instances where the center segment may not be the most efficient. Samples that are processed in a liquid form and then transferred into a planchet to be dried prior to counting will often migrate the residual material to the outside edge of the planchet.

Although this document discusses detector arrays in round configuration, it should be noted that a segmented detector array can be any shape as long as the segment size remains constant.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

The invention claimed is:

1. A radiation detector comprising:
a semiconductor radiation sensing surface comprising N radiation sensing surface segments of equal size, each radiation sensing surface segment being connected to a respective sensor circuit that outputs one of N output analog signals in response to radiation of a first type impinging on the radiation sensing surface segment connected to the sensor circuit; and
a signal processor arrangement having N signal processing circuits that each receive and process one of said N first analog signals, where N is an integer larger than 1;
the detector having a first mode of operation wherein the signal processor arrangement uses the processed first analog signals to determine a Minimum Detectable Activity of said radiation of a first type, emitted by a first source of radiation having a first size and located at a first distance of the detector, impinging on each of the radiation sensing segments and impinging on each combination of the radiation sensing segments.

2. The detector of claim 1, wherein the signal processor arrangement is provided to display each calculated Minimum Detectable Activity of said radiation of a first type to a user in said first mode of operation, and is arranged for, in a second mode of operation, display measurements of activity of said radiation of a first type emitted by a second source of radiation having said first size and located at said first distance of the detector made only by a radiation sensing segment or combination of radiation sensing segments selected by said user.

3. The detector of claim 1, wherein the signal processor arrangement is provided to, in a second mode of operation, automatically display measurements of activity of said radiation of a first type emitted by a second source of radiation having said first size and located at said first distance of the detector made only by a radiation sensing segment or combination of radiation sensing segments having the lowest calculated Minimum Detectable Activity of said radiation of a first type.

4. The detector of claim 1, wherein each of said sensor circuits further provides one of N second analog signals output in response to radiation of a second type impinging on the radiation sensing surface segment connected to the sensor circuit, each signal processing circuit being provided to receive and process the first and second analog signals issued by a same sensor circuit; and wherein in said first mode of operation the signal processor arrangement uses the processed second analog signals to determine a Minimum Detectable Activity of said radiation of a second type emitted by said first source of radiation having a first size and located at a first distance of the detector and impinging on each of the radiation sensing segments and on each combination of the radiation sensing segments.

5. The detector of claim 4, wherein the signal processor arrangement is provided to display each calculated Minimum Detectable Activity of said radiation of a first type to a user in said first mode of operation, and is arranged for, in a second mode of operation, display measurements of activity of said radiation of a first type emitted by a second source of radiation having said first size and located at said first distance of the detector made only by a first radiation sensing segment or combination of radiation sensing segments selected by said user; and wherein the signal processor arrangement is provided to display each calculated Minimum Detectable Activity of said radiation of a second type to a user in said first mode of operation, and is arranged for, in said second mode of operation, display measurements of activity of said radiation of a second type emitted by said second source of radiation made only by a second radiation sensing segment or combination of radiation sensing segments selected by said user.

6. The detector of claim 4,
wherein the signal processor arrangement is provided to, in a second mode of operation, automatically display measurements of activity of said radiation of a first type emitted by a second source of radiation having said first size and located at said first distance of the detector made only by a radiation sensing segment or combination of radiation sensing segments having a lowest calculated Minimum Detectable Activity of said radiation of a first type; and wherein the signal processor arrangement is provided to, in said second mode of operation, automatically display measurements of activity of said radiation of a second type emitted by said second source of radiation made only by a radiation sensing segment or combination of radiation sensing segments having a lowest calculated Minimum Detectable Activity of said radiation of a second type.

7. The detector of claim 1, wherein each radiation sensing surface segment comprises a sensing conductor electrically connected to a signal conductor; the sensing and signal conductors of all the radiation sensing surface segments being coplanar.

8. The detector of claim 7, wherein each signal conductor is adjacent to at least another signal conductor.

9. The detector of claim 1, wherein each said radiation sensing surface segments is of different shape.

10. A radiation detector comprising:
a semiconductor radiation sensing surface comprising N radiation sensing surface segments of equal size, each radiation sensing surface segment being connected to a respective sensor circuit that outputs one of N output analog signals in response to radiation of a first type impinging on the radiation sensing surface segment connected to the sensor circuit; and a signal processor arrangement having N signal processing circuits that each receive and process one of said N first analog signals, where N is an integer larger than 1;

wherein the semiconductor radiation sensing surface forms a simple geometric shape and wherein each radiation sensing surface segment forms 1/Nth of the semiconductor radiation sensing surface; wherein the semiconductor radiation sensing surface forms a circle, wherein N=3 and wherein the three radiation sensing surface segments comprise two circle caps separated by a wedge.

11. The detector of claim 10, wherein the semiconductor radiation sensing surface forms a circle, and wherein each radiation sensing surface segment forms a radial sector of said circle.

12. The detector of claim 10, wherein the semiconductor radiation sensing surface forms a circle, and wherein a first radiation sensing surface segment forms a sub-circle having the same center as said circle and the other radiation sensing surface segments form concentric rings having the same center as said circle.

13. The detector of claim 10, wherein the semiconductor radiation sensing surface forms a circle, and wherein a first radiation sensing surface segment forms a sub-circle having the same center as said circle and the other radiation sensing surface segments form sectors of a ring having the same center as said circle.

14. The detector of claim 10, wherein the semiconductor radiation sensing surface forms a circle, and wherein a first radiation sensing surface segment forms a sub-circle having the same center as said circle and the other radiation sensing surface segments form sectors of a plurality of concentric rings having the same center as said circle.

15. A method of detecting radiation, the method comprising:
providing a semiconductor radiation sensing surface comprising N radiation sensing surface segments of equal size, each radiation sensing surface segment being connected to a respective sensor circuit that outputs one of N output analog signals in response to radiation of a first type impinging on the radiation sensing surface segment connected to the sensor circuit; and providing a signal processor arrangement having N signal processing circuits that each receive and process one of said N first analog signals, where N is an integer larger than 1;

the method comprising, during a first mode of operation, providing a first source of said radiation of a first type having a first size and located at a first distance of the detector; and with the signal processor arrangement, using the processed first analog signals to determine a Minimum Detectable Activity of said radiation of a first type impinging on each of the radiation sensing segments and impinging on each combination of the radiation sensing segments.

16. The method of claim 15 comprising:
with the signal processor arrangement, displaying each calculated Minimum Detectable Activity of said radiation of a first type to a user in said first mode of operation and allowing said user to select a radiation sensing segment or combination of radiation sensing segments; and in a second mode of operation, replacing said first source by a second source of said radiation of a first type having said first size and located at said first distance of the detector; and displaying measurements of activity of said radiation of a first type made only by the radiation sensing segment or combination of radiation sensing segments selected by said user.

17. The method of claim 15, comprising:
in a second mode of operation, replacing said first source by a second source of said radiation of a first type having said first size and located at said first distance of the detector; and automatically displaying with the signal processor arrangement a measurement of activity of said radiation of a first type made only by a radiation sensing segment or combination of radiation sensing segments having a lowest calculated Minimum Detectable Activity of said radiation of a first type.

18. The method of claim 15, wherein each said radiation sensing surface segments is of different shape.

19. A method of measuring radiations, the method comprising:
providing a radiation sensing surface comprising N radiation sensing surface segments of equal size; and
in a first mode of operation:
measuring a background noise for each segment or combination of segments for at least one measured radiation;
providing a calibration sample having a given diameter at a measurement location in front of said radiation sensing surface;
determining an efficiency for each segment or combination of segments for said sample for said at least one measured radiation;
determining a Minimum Detectable Activity for each segment or combination of segments for said at least one measured radiation using said background noises and efficiencies; and
selecting automatically or manually a segment or combination of segments having the lowest MDA for said at least one measured radiation; and
in a second mode of operation, determining an amount of said at least one measured radiation emitted by a measurement sample having the same position and diameter as the calibration sample, using the segment or combination of segments selected for said at least one measured radiation.

20. The method of claim 19, wherein said at least one radiation comprises at least a first radiation and a second radiation; and wherein:
said measuring a background noise for each segment or combination of segments for at least one measured radiation comprises measuring a background noise for each segment or combination of segments separately for the first and second measured radiations;
said determining an efficiency for each segment or combination of segments for said calibration sample for said at least one measured radiation comprises determining an efficiency for each segment or combination of segments for said calibration sample separately for the first and second measured radiations;
said determining a Minimum Detectable Activity for each segment or combination of segments for said at least one measured radiation using said background noises and efficiencies comprises determining a Minimum Detectable Activity for each segment or combination of segments separately for the first and second measured radiations;
said selecting automatically or manually a segment or combination of segments having the lowest MDA for said at least one measured radiation comprises selecting automatically or manually a segment or combination of segments having the lowest MDA separately for the first and second measured radiations; and
said determining an amount of said at least one measured radiation emitted by said measurement sample using the segment or combination of segments selected for said at least one measured radiation comprises determining separately an amount of said first and second measured radiation emitted by said measurement sample using the segment or combination of segments selected for said first and second measured radiations.

* * * * *